(12) United States Patent
Son et al.

(10) Patent No.: US 12,082,279 B2
(45) Date of Patent: Sep. 3, 2024

(54) ELECTRONIC DEVICE FOR SWITCHING COMMUNICATION CONNECTIONS ACCORDING TO NOISE ENVIRONMENT AND METHOD FOR CONTROLLING THE SAME

(71) Applicant: Samsung Electronics Co., Ltd., Gyeonggi-do (KR)

(72) Inventors: Beakkwon Son, Gyeonggi-do (KR); Sangeun Kim, Gyeonggi-do (KR); Sanghyeok Kim, Gyeonggi-do (KR); Hangil Moon, Gyeonggi-do (KR); Kyoungho Bang, Gyeonggi-do (KR); Soonho Baek, Gyeonggi-do (KR); Jaemo Yang, Gyeonggi-do (KR); Gunwoo Lee, Gyeonggi-do (KR); Byoungchul Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 17/568,062

(22) Filed: Jan. 4, 2022

(65) Prior Publication Data

US 2022/0225449 A1 Jul. 14, 2022

Related U.S. Application Data

(63) Continuation of application No. PCT/KR2021/020009, filed on Dec. 28, 2021.

(30) Foreign Application Priority Data

Jan. 12, 2021 (KR) .......................... 10-2021-0003876

(51) Int. Cl.
*H04W 76/15* (2018.01)
*H04B 17/336* (2015.01)
(Continued)

(52) U.S. Cl.
CPC .......... *H04W 76/15* (2018.02); *H04B 17/336* (2015.01); *H04W 76/19* (2018.02); *H04W 76/34* (2018.02)

(58) Field of Classification Search
CPC ..... H04W 76/15; H04W 76/19; H04W 76/34; H04B 17/336
See application file for complete search history.

(56) References Cited

U.S. PATENT DOCUMENTS 8,340,319 B2 * 12/2012 Kinouchi ......... G10K 11/17873
381/94.1
10,485,049 B1 11/2019 Batta et al.
(Continued)

FOREIGN PATENT DOCUMENTS

CN 109413526 A 3/2019
CN 110166879 A 8/2019
(Continued)

OTHER PUBLICATIONS

International Search Report dated Apr. 8, 2022.
European Search Report dated May 21, 2024.

*Primary Examiner* — Duc C Ho
(74) *Attorney, Agent, or Firm* — Cha & Reiter, LLC

(57) ABSTRACT

Certain embodiments of the disclosure include a first electronic device, comprising at least one microphone, a communication circuit, and at least one processor, wherein the at least one processor is configured to: establish a first communication connection with an external electronic device using the communication circuit, transmit through the first communication connection, to the external electronic device, using the communication circuit, information for a first voice signal obtained using the at least one microphone, receive second noise information for a second voice signal from the second electronic device, by the communication circuit, wherein the second voice signal corresponding to the first voice signal was obtained by a second electronic device while the information for the first voice signal was transmitted to the external electronic device, and transmit, based on first noise information for the first voice signal and the
(Continued)

received second noise information satisfy a specified condition, first control information for allowing the second electronic device to establish a second communication connection with the external electronic device, using the communication circuit.

20 Claims, 12 Drawing Sheets

(51) Int. Cl.
*H04W 76/19* (2018.01)
*H04W 76/34* (2018.01)

(56) References Cited

U.S. PATENT DOCUMENTS

| | | |
|---|---|---|
| 2012/0224731 A1 | 9/2012 | Zellner |
| 2015/0245129 A1 | 8/2015 | Dusan et al. |
| 2016/0163306 A1 | 6/2016 | Tae et al. |
| 2017/0061953 A1 | 3/2017 | An et al. |
| 2017/0133002 A1 | 5/2017 | Jung |
| 2017/0192743 A1 | 7/2017 | Chun et al. |
| 2018/0338197 A1 | 11/2018 | Jeong et al. |
| 2019/0058617 A1* | 2/2019 | Kolsrud ........ G06F 13/382 |
| 2021/0303254 A1 | 9/2021 | Wang et al. |

FOREIGN PATENT DOCUMENTS

| | | |
|---|---|---|
| KR | 10-1022312 B1 | 3/2011 |
| KR | 10-2016-0068408 A | 6/2016 |
| KR | 10-2017-0024913 A | 3/2017 |
| KR | 10-2017-0055329 A | 5/2017 |
| KR | 10-2017-0082405 A | 7/2017 |
| KR | 10-2018-0127041 A | 11/2018 |
| KR | 10-2011844 B1 | 10/2019 |

* cited by examiner

ELECTRONIC DEVICE FOR SWITCHING COMMUNICATION CONNECTIONS ACCORDING TO NOISE ENVIRONMENT AND METHOD FOR CONTROLLING THE SAME

CROSS REFERENCE TO RELATED APPLICATION(S)

This application is a continuation application, claiming priority under § 365(c), of an International application No. PCT/KR2021/020009, filed on Dec. 28, 2021, which is based on and claims the benefit of a Korean patent application number 10-2021-0003876, filed on Jan. 12, 2021, in the Korean Intellectual Property Office, the disclosures of which is incorporated by reference herein in its entirety.

BACKGROUND

1. Field

Certain embodiments of the disclosure relate to an electronic device for switching communication connections according to a noise environment and a method for controlling the same.

2. Description of Related Art

With digital technology advancing, electronic devices come in various types, such as smartphones, tablet personal computers (PCs), or personal digital assistants (PDAs). Electronic devices can be worn by users to enhance portability and user accessibility.

An electronic device may be an ear-wearable device including a pair of earphones (hereinafter, earbuds) that may be worn on the user's ears. The ear-wearable device may be connected with an external electronic device (e.g., a portable terminal). The ear-wearable device may transmit voice data to the external electronic device, and the external electronic device may transmit audio data (or audio content) to the ear-wearable device. The ear-wearable device may output the audio data (or audio content) received from the external electronic device through a speaker.

SUMMARY

Certain embodiments of the disclosure include a first electronic device, comprising at least one microphone, a communication circuit, and at least one processor, wherein the at least one processor is configured to: establish a first communication connection with an external electronic device using the communication circuit, transmit through the first communication connection, to the external electronic device, using the communication circuit, information for a first voice signal obtained using the at least one microphone, receive second noise information for a second voice signal from a second electronic device, by the communication circuit, wherein the second voice signal corresponding to the first voice signal was obtained by the second electronic device while the information for the first voice signal was transmitted to the external electronic device, and selectively transmit, based on whether first noise information for the first voice signal and the received second noise information satisfy a specified condition, first control information commanding, or for allowing the second electronic device to establish a second communication connection with the external electronic device, using the communication circuit.

Certain embodiments of the disclosure include a method for controlling a first electronic device. The method comprises: establishing a first communication connection with an external electronic device, using a communication circuit of the first electronic device; transmitting through the established first communication connection, to the external electronic device, using the communication circuit, information for a first voice signal obtained using at least one microphone of the first electronic device; receiving second noise information for a second voice signal from a second electronic device, using the communication circuit, wherein a second voice signal corresponding to the first voice signal is obtained by the second electronic device while the information for the first voice signal is transmitted to the external electronic device; and selectively transmitting, based on whether first noise information for the first voice signal and the received second noise information satisfy a specified condition, first control information commanding, or for allowing the second electronic device to establish a second communication connection with the external electronic device, using the communication circuit.

According to certain embodiments, an electronic device comprises: at least one microphone; a communication circuit; and at least one processor, wherein the at least one processor is configured to: obtain a second voice signal using the at least one microphone, identify second noise information for the obtained second voice signal, transmit the identified second noise information to a first electronic device using the communication circuit, receive first control information; responsive to receiving the first control information, establish a communication connection with a second electronic device using the communication circuit based on the transmission of the second noise information, and establish a second communication connection with an external electronic device using the communication circuit, and transmit information for a voice signal obtained using the at least one microphone to the external electronic device through the established second communication connection.

DETAILED DESCRIPTION

Earbuds may provide various functions. For example, each earbud may include a microphone to detect the user's voice and thus transmit data representing the user's voice to an external electronic device (e.g., a portable terminal).

An ear-wearable device composed of a pair of earbuds may be, e.g., a true wireless stereo (TWS) headset. The earbuds constituting the TWS headset may be wirelessly communicatively connected with each other. The microphone of one of the pair of earbuds may be used as the main microphone (MIC), and data for the user's voice detected through the main microphone may be transmitted to the external electronic device (e.g., a portable terminal).

If an external voice is detected in a noise environment, not only the user's voice but also noise from the ambient environment may be introduced with the voice through the microphone. In this case, the level of noise that may be detected by the microphone of each earbud may be different. For example, directional noise, such as wind, may cause relatively more noise to one earbud and may cause relatively less noise to the other earbud. If the main microphone for detecting the user's voice is fixed, a lot of noise may be introduced with the voice, so that the quality of the call through the user's voice may be degraded.

According to certain embodiments, there may be provided an electronic device for setting and/or changing a microphone to be used as a main microphone by identifying noise for each earbud and a method for controlling the same.

According to certain embodiments, there may be provided an electronic device for establishing or releasing a communication connection with an external electronic device to set and/or change a microphone to be used as a main microphone and a method for controlling the same.

According to certain embodiments, the electronic device may compare noises for the earbuds with each other and detect the user's voice through the microphone of the earbuds less influenced by the noise, thereby providing enhanced call quality.

Various effects achievable according to the disclosure are not limited by the foregoing effects.

Figure 1:
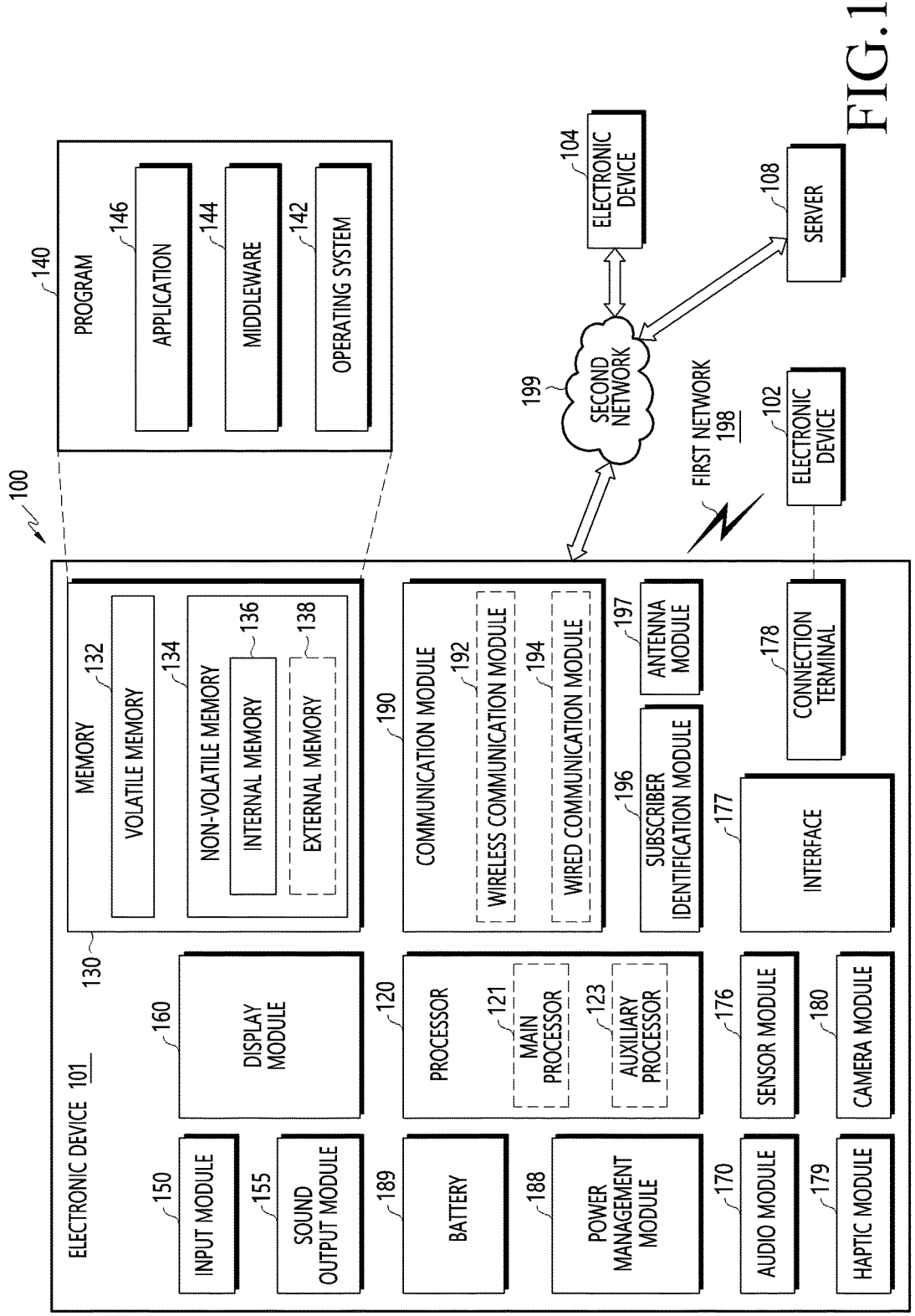
FIG. 1 is a block diagram illustrating an electronic device in a network environment according to certain embodiments.

FIG. 1 describes an electronic device wherein certain embodiments can be practiced. One or more electronic devices 102 may be wearable electronic devices such as earbuds. According to certain embodiments, the electronic device may compare noises for the earbuds with each other and detect the user's voice through the microphone of the earbuds less influenced by the noise, thereby providing enhanced call quality. Data for the user's voice detected through the main microphone may be transmitted to the external electronic device (e.g., a portable terminal).

FIG. 1 is a block diagram illustrating an electronic device 101 in a network environment 100 according to certain embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The term "processor" as used in this document shall be understood to refer to both the singular and plural contexts.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

The antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

As noted above, electronic devices 102 can be earbuds with microphones. If an external voice is detected in a noise environment, not only the user's voice but also noise from the ambient environment may be introduced with the voice through the microphone. In this case, the level of noise that may be detected by the microphone of each earbud may be different. For example, directional noise, such as wind, may cause relatively more noise to one earbud and may cause relatively less noise to the other earbud. If the main microphone for detecting the user's voice is fixed, a lot of noise may be introduced with the voice, so that the quality of the call through the user's voice may be degraded.

Figure 2:
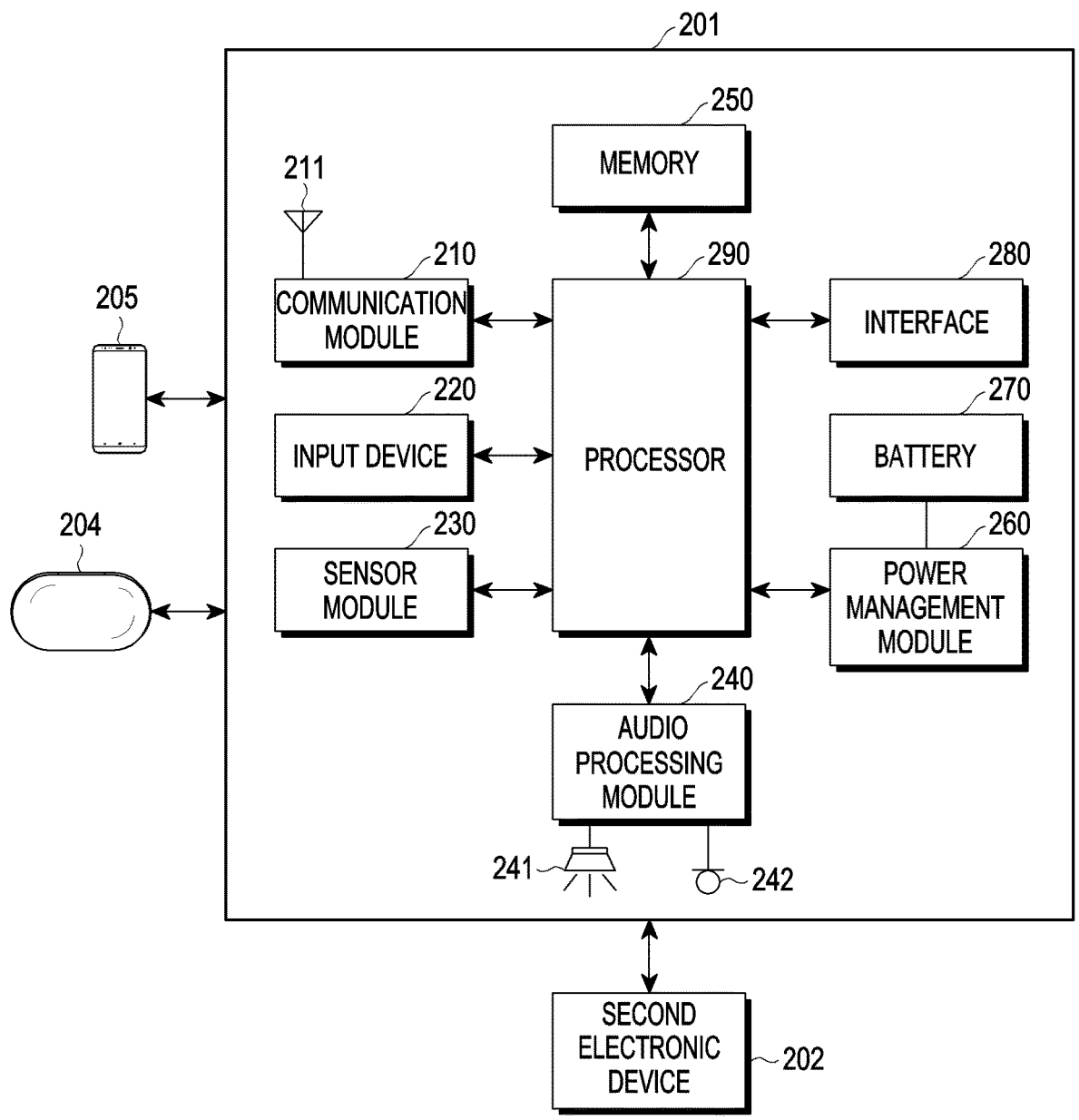
FIG. 2 is a block diagram illustrating a first electronic device that wirelessly receives audio data from an external electronic device, according to certain embodiments.

In FIG. 2, electronic device 201 establishes communication with a portable electronic device 205 and a second electronic device 202. The electronic device 201 can correspond to a first earbud and the second electronic device 202 can correspond to a second earbud. The electronic device 201 includes a microphone 242 that obtains a voice signal. The second electronic device 202 obtains the voice signal from a different vantage point. The electronic device 201 receives the noise information from the second electronic device 202. Based on the noise information from the voice signal received at the first electronic device 201 and the noise information received from the second electronic device 202, electronic device 201 transmits control information commanding, or for allowing the second electronic device 202 to establish a communication connection to electronic device 205.

FIG. 2 is a block diagram illustrating a first electronic device 201 (e.g., electronic device 102 of FIG. 1) communicating with a second external electronic device 205 (e.g., the electronic device 101 of FIG. 1).

When the first electronic device 201 is communicatively connected with the second electronic device 202, the first electronic device 201 may become a master device and the second electronic device 202 may become a slave device. The first electronic device 201 serving as the master device may establish a communication connection with the second external electronic device 205 and receive data (e.g., an audio signal) from the second external electronic device 205 through the established communication connection. The first electronic device 201 serving as the master device may transmit voice data (e.g., information about a voice signal) to the second external electronic device 205 through the established communication connection.

The second electronic device 202 serving as the slave device does not establish a communication connection with the second external electronic device 205 and may obtain data (e.g., an audio signal) transmitted by the second external electronic device 205. For example, the second electronic device 202 as a slave device may obtain the data (e.g., an audio signal) transmitted by the second external electronic device 205 by receiving the data (e.g., an audio signal), from the second external electronic device 205 via the first electronic device 201. The second electronic device 202 may also receive the data by identifying (e.g., sniffing) the data (e.g., an audio signal) transmitted by the second external electronic device 205 using connection information for the communication connection formed between the first electronic device 201 and the second external electronic device 205. The second electronic device 202 serving as the slave device may also establish a communication connection with the second external electronic device 205 and may also receive data (e.g., an audio signal) from the second external electronic device 205 through the established communication connection.

When the first electronic device 201 is communicatively connected with the second electronic device 202, the first electronic device 201 may become a slave device and the second electronic device 202 may become a master device. A method for determining the first electronic device 201 and the second electronic device 202 as a master device or a slave device or a method for changing (e.g., switching) to a master device or slave device is described below in more detail with reference to the drawings.

The first electronic device 201 may include the same or similar components to at least one of the components (e.g., modules) of the electronic device 101 illustrated in FIG. 1. The first electronic device 201 may be the external electronic device 102 of FIG. 1 or the external electronic device 104 of FIG. 1. The first electronic device 201 may include an antenna module 211 (e.g., the antenna module 197 of FIG. 1), a communication module 210 (e.g., the communication module 190 of FIG. 1), an input device 220 (e.g., the input device 150 of FIG. 1), a sensor module 230 (e.g., the sensor module 176 of FIG. 1), an audio processing module 240 (e.g., the audio module 170 of FIG. 1), a memory 250 (e.g., the memory 130 of FIG. 1), a power management module 260 (e.g., the power management module 188 of FIG. 1), a battery 270 (e.g., the battery 189 of FIG. 1), an interface 280 (e.g., the interface 177 of FIG. 1), and a processor 290 (e.g., the processor 120 of FIG. 1).

The microphone 242 may include at least one air conduction microphone and/or at least one bone conduction microphone for detecting voice. The air conduction microphone may detect the voice (e.g., the user's utterance) transferred through air and output a voice signal corresponding to the detected voice. The bone conduction microphone may measure the vibration of the user's bone (e.g., skull) due to the user's utterance and may output a voice signal corresponding to the measured vibration. The bone conduction microphone may be referred to as a bone conduction sensor or in other various terms. The voice detected by the air conduction microphone is a voice mixed with external noise while the user's utterance is transferred through the air, whereas the voice detected by the bone conduction microphone may be mixed with less noise (e.g., influence by noise) because it is detected from the vibration of the bone. Therefore, the bone conduction microphone may output a voice signal corresponding to the user's voice with reduced external noise even in a high-noise environment. Moreover, noise information can be deduced by comparing the voice signal from the bone conduction microphone and the voice signal received from the air conduction microphone, such as subtracting. The voice signal output from the microphone 242 may be transferred to the processor 290. An acceleration sensor (e.g., the sensor module 230) may be used to obtain a voice signal corresponding to the user's voice with reduced external noise. For example, the acceleration sensor may measure the vibration of the user's skin due to the user's voice utterance and output a voice signal corresponding to the measured vibration to the processor 290. Since the voice (e.g., vibration) detected by the acceleration sensor is detected from the vibration of the skin, the inflow of external noise (e.g., the influence by noise) may be small. The above-described bone conduction microphone and/or acceleration sensor may be referred to as a voice pickup unit (VPU) or may be referred to in other various terms.

The communication module 210 may include a wireless communication module (e.g., a cellular communication module, a wireless-fidelity (Wi-Fi) communication module, a Bluetooth communication module, a near-field communication (NFC) communication module, or a global navigation satellite system (GNSS) communication module) or a wired communication module (e.g., a local area network (LAN) communication module or a power line communication (PLC) module). A corresponding communication module among these communication modules may communicate with at least one of a first external electronic device 204 (e.g., a charger), a second external electronic device 205 (e.g., a portable terminal), or a second electronic device 202 through a first network (e.g., the first network 198 of FIG. 1) or a second network (e.g., the second network 199 of FIG. 1). The second electronic device 202 may be an earbud configured in pair with the first electronic device 201. The communication module 210 may include one or more communication processors that are operable independently from the processor 290 and supports a direct (e.g., wired) communication or a wireless communication.

The antenna module 211 may transmit a signal or power to, or receive a signal or power from, another electronic device (e.g., the external electronic device 204 or 205 or the second electronic device 202). The antenna module 211 may include one antenna including a radiator formed of a conductor or conductive pattern formed on a substrate (e.g., a printed circuit board (PCB)). The antenna module 211 may include a plurality of antennas. In this case, at least one antenna appropriate for a communication scheme used in a communication network, such as the first network (e.g., the first network 198 of FIG. 1) or the second network (e.g., the second network 199 of FIG. 2), may be selected from the plurality of antennas by, e.g., the communication module 210. The signal or the power may then be transmitted or received between the communication module 210 and another electronic device via the selected at least one antenna. According to an embodiment, other parts (e.g., radio frequency integrated circuit (RFIC)) than the radiator may be further formed as part of the antenna module 211.

The antenna module 211 may include at least one of a coil, where current may be induced by a magnetic field, a resonator, where a resonance phenomenon is generated by a magnetic field having a specific resonant frequency, or a plurality of patch antennas for receiving electromagnetic waves, to wirelessly receive power from another electronic device (e.g., the external electronic device 204 or 205 or the second electronic device 202).

The input device 220 may be configured to generate various input signals required to operate the first electronic device 201. The input device 220 may include a touch pad, a touch panel, or a button. The touch pad may recognize touch inputs in at least one of capacitive, resistive, infrared, or ultrasonic methods. If a capacitive touch pad is provided, physical contact or proximity recognition may be possible. The touch pad may further include a tactile layer. The touch pad including the tactile layer may provide a tactile response to the user. The button may include, e.g., a physical button or an optical key.

The input device 220 may generate a user input regarding the turn-on/off of the first electronic device 201. The input device 220 may receive a user input for a communication connection between the first electronic device 201 and the second external electronic device 205. The input device 220 may receive a user input associated with audio data (or audio content). For example, the user input may be associated with functions of starting playback of audio data, pausing playback, stopping playback, adjusting playback speed, adjusting playback volume, or muting. The operation of the first electronic device 201 may be controlled by various gestures, such as tapping or swiping up/down the surface on which the touch pad is installed. If a gesture related to a single tap is detected through the input device 220, the first electronic device 201 (or the processor 290) plays or pause the playback of audio data. If a gesture related to a double tap is detected through the input device 220, the first electronic device 201 may switch the playback to the next audio data. If a gesture related to a triple tap is detected through the input device 220, the first electronic device 201 may switch the playback to the previous audio data. According to an embodiment, if a gesture of swiping up or down is detected through the input device 220, the first electronic device 201 may adjust the volume related to the playback of audio data. If a gesture related to a double tap is detected through the input device 220 when an incoming call is received, the first electronic device 201 may connect the call.

The sensor module 230 may measure a physical quantity or detect an operational state of the first electronic device 201. The sensor module 230 may convert the measured or detected information into an electrical signal. The sensor module 230 may include, e.g., an acceleration sensor, a gyro sensor, a geomagnetic sensor, a magnetic sensor, a proximity sensor, a gesture sensor, a grip sensor, or a biometric sensor. According to an embodiment, the first electronic device 201 may further include an optical sensor. The optical sensor may include a light emitting unit (e.g., a light emitting diode (LED)) that outputs light of at least one wavelength band. The optical sensor may include a light receiving unit (e.g., a photodiode) that receives light of one or more wavelength bands scattered or reflected from an object and generates an electrical signal.

The audio processing module 240 may support an audio data gathering function. The audio processing module 240 may play the gathered audio data. According to an embodiment, the audio processing module 240 may include an audio decoder (not shown) and a D/A converter (not shown). The audio decoder may convert audio data stored in the memory 250 into a digital audio signal. The D/A converter may convert the digital audio signal converted by the audio decoder into an analog audio signal. The audio decoder may convert audio data received from the second external electronic device 205 through the communication module 210 and stored in the memory 250 into a digital audio signal. The speaker 241 may output the analog audio signal converted by the D/A converter. According to an embodiment, the audio processing module 240 may include an A/D converter (not shown). The A/D converter may convert the analog audio signal transferred through the microphone 242 into a digital voice signal.

The audio processing module 240 may play various audio data set in the operation of the first electronic device 201. For example, if it is detected that the first electronic device 201 is plugged or unplugged into/from an ear, the audio processing module 240 may be designed to play audio data related to a corresponding effect or guide sound. According to certain embodiments, if it is detected that the first electronic device 201 is coupled to, or decoupled from, the first external electronic device 204, the audio processing module 240 may be designed to play audio data related to a corresponding effect or guide sound. The output of the sound effect or guide sound may be omitted according to the user setting or the designer's intention. The audio processing module 240 may be designed to be included in the processor 290.

The memory 250 may store various data used by at least one component (e.g., the processor 290 or a sensor module 230) of the electronic device 201. The various data may include, for example, software and input data or output data for a command related thereto. The memory 250 may include a volatile memory or a non-volatile memory.

The memory 250 may include a non-volatile memory that stores the first audio data (non-volatile audio data) received from the second external electronic device 205. The memory 250 may include a volatile memory that stores second audio data (e.g., volatile audio data) received from the second external electronic device 205.

The memory 250 may store local address information, peer address information, and authentication address information. The local address information for the first electronic device 201 may indicate a Bluetooth device address (e.g., BD_ADDR) of the first electronic device 201, and peer address information for the first electronic device 201 may indicate the Bluetooth device address of the counterpart device (e.g., the second electronic device 202) configured in pair with the first electronic device 201 in the Bluetooth network. The local address information and the peer address information for the first electronic device 201 may be used for a communication connection between the first electronic device 201 and a counterpart device (e.g., the second electronic device 202) configured in pair or for communication connection with the second external electronic device 205. The local address information or the peer address information may be in the form of a 6-byte Bluetooth device address (e.g., BD_ADDR) or LE address information generated based on the Bluetooth device address. The authentication address information for the first electronic device 201 may be address information for the first external electronic device 204 for storing the first electronic device 201 and may include communication address information (e.g., MAC address or Bluetooth address) of the first external electronic device 301 or unique identification information, such as a serial number set by the manufacturer of the first external electronic device 301, and may be set in the first electronic device 201. The initial state of the first electronic device 201 may include a state in which authentication address information is not set.

The power management module 260 may manage power supplied to the first electronic device 201. The power management module 260 may be implemented as at least part of, for example, a PMIC. The power management module 260 may include a battery charging module. If another electronic device (e.g., the external electronic device 204 or 205 or the second electronic device 202) is electrically connected with the first electronic device 201 (wirelessly or wiredly), the power management module 260 may receive power from the other electronic device to charge the battery 270. If the first electronic device 201 is inserted into the first external electronic device 204, with the first electronic device 201 powered off, the first electronic device 201 may power on the first electronic device 201 or turn on at least part of the communication module 210 based on the power received from the other electronic device.

The battery 270 may supply power to at least one component of the first electronic device 201. The battery 270 may include, for example, a primary cell which is not rechargeable, a secondary cell which is rechargeable, or a fuel cell. If the first electronic device 201 is inserted into the first external electronic device 204, the first electronic device 201 may charge the battery 270 to a previously designated charge level and then power on the first electronic device 201 or turn on at least part of the communication module 210.

The interface 280 may support one or more specified protocols to be used for the first electronic device 201 to be coupled with the external electronic device 204 or 205 directly (e.g., wiredly) or wirelessly. The interface 280 may include, for example, a high definition multimedia interface (HDMI), a universal serial bus (USB) interface, a secure digital (SD) card interface, or an audio interface. The interface 280 may include a connecting terminal for forming a physical connection with the first external electronic device 204.

The first electronic device 201 may include a display device (not shown). The display device may be configured to provide various screen interfaces required for operation of the first electronic device 201. The display device may provide the user interface related to the play of audio data. The display device may provide a user interface related to a function of receiving audio data from the second external electronic device 205 or a function of transmitting audio data to the second external electronic device 205. The display device may include a light emitting means, such as an LED. For example, the light emitting means may be controlled to emit a color of light corresponding to charging or completion of charging. For example, if the first electronic device 201 is communicatively connected with the second external electronic device 205, the light emitting means may be controlled to emit a specific color of light. For example, the light emitting means may be controlled to emit a specific color of light depending on the playing state of the audio data (e.g., during play or pause). For example, the light emitting means may be controlled to emit a specific color of light according to a user input generated through the input device.

The processor 290 may execute, e.g., software to control at least one other component (e.g., a hardware or software component) of the first electronic device 201 connected with the processor 290 and may process or compute various data. As at least part of the data processing or computation, the processor 290 may load a command or data received from another component (e.g., the sensor module 230 or communication module 210) onto a volatile memory 250, process the command or the data stored in the volatile memory, and store resulting data in a non-volatile memory.

The processor 290 may identify whether an electrical connection is formed between the first electronic device 201 and the first external electronic device 204 through the sensor module 230 or the interface 280. The processor 290 may recognize a magnet installed in the first external electronic device 204 through a magnetic sensor (e.g., a hall sensor) included in the sensor module 230, thereby identifying whether an electrical connection is formed between the first electronic device 201 and the first external electronic device 204. The processor 290 may recognize that the connecting terminal included in the interface 280 contacts the connecting terminal installed in a mounting part of the first external electronic device 204, thus identifying whether an electrical connection is formed between the first electronic device 201 and the first external electronic device 204. The processor 290 may identify whether the first electronic device 201 is worn on the ear through the sensor module 230.

The first electronic device 201 may further include various modules depending on the form in which it is provided. There are many variations according to the convergence trend of digital devices, so it is not possible to list them all, but components equivalent to the above-mentioned components may be further included in the first electronic device 201. Further, it is apparent that in the first electronic device 201 according to an embodiment, specific components may be excluded from the above components or replaced with other components according to the form in which it is provided. This will be easily understood by those of ordinary skill in the art.

The second electronic device 202 configured in pair with the first electronic device 201 may include the same components as those included in the first electronic device 201 and may perform all or some of the operations of the first electronic device 201 described below in connection with the drawings.

Operations described in the disclosure may be operations performed by the processor 290 of the first electronic device 201 or the second electronic device 202 unless otherwise specified.

Figure 3:
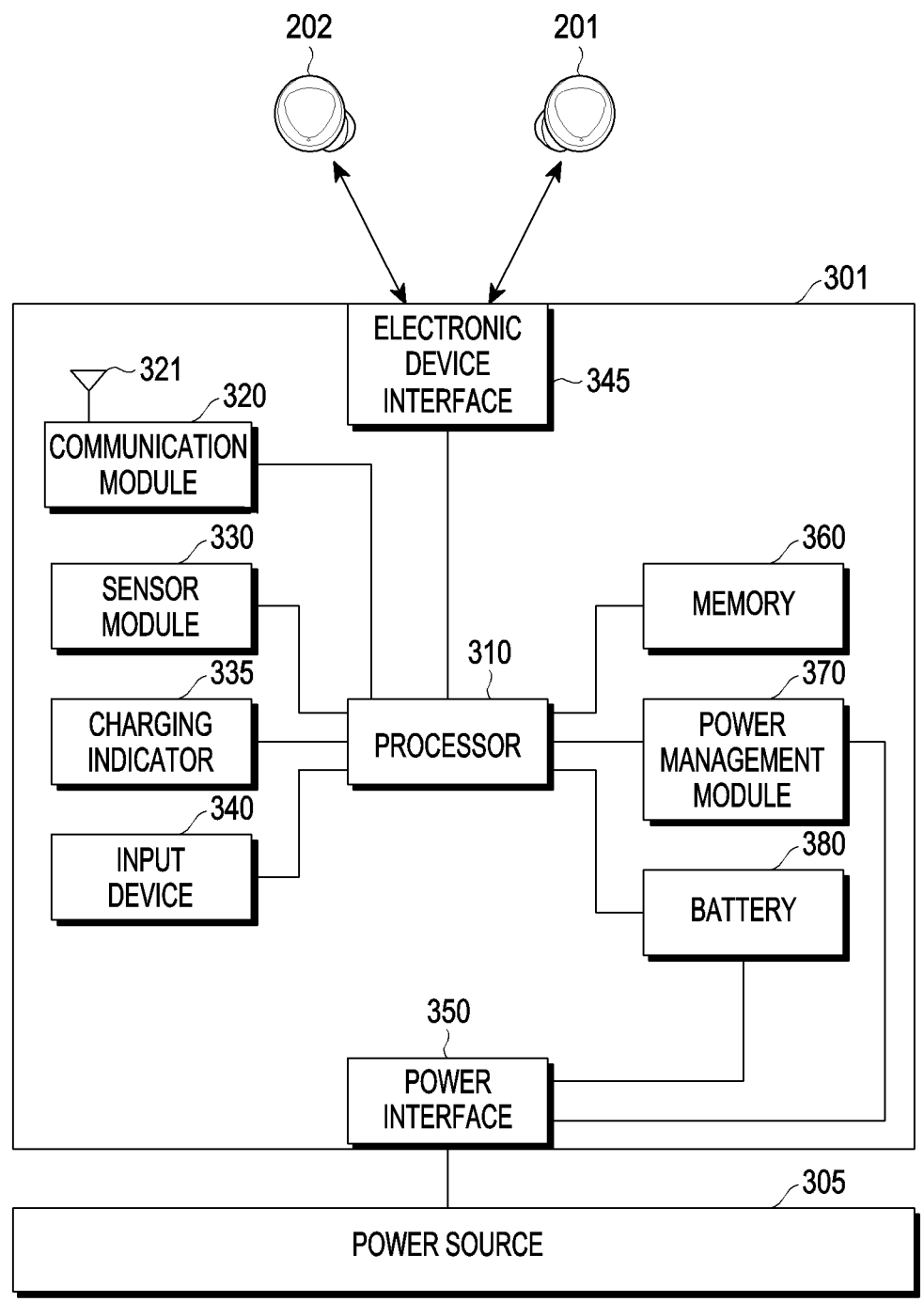
FIG. 3 is a block diagram illustrating a first external electronic device storing at least one electronic device, according to certain embodiments.

FIG. 3 is a block diagram illustrating a first external electronic device 301 (e.g., the first external electronic device 204 of FIG. 2) storing at least one electronic device (e.g., the first electronic device 201 and/or the second electronic device 202 of FIG. 2) according to certain embodiments.

The first external electronic device 301 may be a case device for storing the first electronic device 201 and the second electronic device 202. The first external electronic device 301 may include a processor 310, an antenna module 321, a communication module 320, a sensor module 330, at least one charging indicator 335, an input device 340, an electronic device interface 345, a power interface 350, a memory 360, a power management module 370, and a battery 380.

The processor 310 may execute, e.g., software to control at least one other component (e.g., a hardware or software component) of the first external electronic device 301 connected with the processor 310 and may process or compute various data. According to an embodiment, as at least part of the data processing or computation, the processor 310 may load a command or data received from another component (e.g., the sensor module 330 or communication module 320) onto a volatile memory 360, process the command or the data stored in the volatile memory, and store resulting data in a non-volatile memory.

The communication module 320 may include a wireless communication module (e.g., a cellular communication module, a wireless-fidelity (Wi-Fi) communication module, a Bluetooth communication module, a near-field communication (NFC) communication module, or a global navigation satellite system (GNSS) communication module) or a wired communication module (e.g., a local area network (LAN) communication module or a power line communication (PLC) module). A corresponding communication module among these communication modules may communicate with at least one of an external electronic device (e.g., the second external electronic device 205 of FIG. 2) (e.g., a portable terminal), or electronic devices 201 and 202 through a first network (e.g., the first network 198 of FIG. 1) or a second network (e.g., the second network 199 of FIG. 1). The communication module 320 may include one or more communication processors that are operable independently from the processor 310 and supports a direct (e.g., wired) communication or a wireless communication.

The antenna module 321 may transmit a signal or power to another electronic device (e.g., an external electronic device (e.g., the second external electronic device 205 of FIG. 2) or electronic devices 201 and 202) or receive a signal or power from the other electronic device. According to an embodiment, the antenna module 321 may include one antenna including a radiator formed of a conductor or conductive pattern formed on a substrate (e.g., a printed circuit board (PCB)). According to an embodiment, the antenna module 321 may include a plurality of antennas. In this case, at least one antenna appropriate for a communication scheme used in a communication network, such as the first network (e.g., the first network 198 of FIG. 1) or the second network (e.g., the second network 199 of FIG. 2), may be selected from the plurality of antennas by, e.g., the communication module 320. The signal or the power may then be transmitted or received between the communication module 320 and another electronic device via the selected at least one antenna. According to an embodiment, other parts (e.g., radio frequency integrated circuit (RFIC)) than the radiator may be further formed as part of the antenna module 321.

The antenna module 321 may include at least one of a coil, where current may be induced by a magnetic field, a resonator, where a resonance phenomenon is generated by a magnetic field having a specific resonant frequency, or a plurality of patch antennas for receiving electromagnetic waves, to wirelessly receive power from a power source 305 or an external electronic device (e.g., the second external electronic device 205 of FIG. 2).

The antenna module 321 may include at least one of a coil forming a change in magnetic field, a resonator for forming a magnetic field with a specific resonant frequency, or a plurality of patch antennas for transmitting electromagnetic waves so as to wirelessly transmit power to the electronic devices 201 and 202.

The sensor module 330 may measure a physical quantity or detect an operational state of the first external electronic device 301. The sensor module 330 may convert the measured or detected information into an electrical signal. The sensor module 330 may include, e.g., an acceleration sensor, a gyro sensor, a geomagnetic sensor, a magnetic sensor, a proximity sensor, a gesture sensor, a grip sensor, an optical sensor, or a biometric sensor. According to an embodiment, the sensor module 330 may detect whether one or more of the electronic devices 201 and 202 are positioned in the first external electronic device 301. According to an embodiment, the sensor module 330 may detect when the cover of the first external electronic device 301 is in an open state and when the cover is in a closed state. According to an embodiment, the processor 310 may be electrically connected with the sensor module 330 and may receive a signal indicating the open state and the closed state of the cover from the sensor module 330. When one or more of the electronic devices 201 and 202 are positioned in the first external electronic device 301 and the cover is changed from the closed state to the open state, the processor 310 may generate a signal to turn on communication modules (e.g., the communication module 210 of FIG. 2) of the electronic devices 201 and 202 and, when one or more of the electronic devices 201 and 202 are positioned in the first external electronic device 301 and the cover is changed from the open state to the closed state, the processor 310 may generate a signal to turn off the communication modules (e.g., the communication module 210 of FIG. 2) of the electronic devices 201 and 202. According to an embodiment, if the cover of the sensor module 330 is in the open state, the processor 310 may be triggered to allow the electronic devices 201 and 202 and the external electronic device (e.g., the second external electronic device 205 of FIG. 2) to enter a pairing mode.

The at least one charging indicator 335 may indicate the charge level of the battery 380 and/or the batteries (e.g., the battery 270 of FIG. 2) of the electronic devices 201 and 202. Through the charging indicator 335 on the surface of the first external electronic device 301, the user may identify the amount of charge of the battery 380 of the first external electronic device 301 or the amount of charge of the batteries (e.g., the battery 270 of FIG. 2) of the electronic devices 201 and 202. The charging indicator 335 may be implemented as a display or may be implemented as an LED.

The input device 340 may be configured to generate various input signals required to operate the first external electronic device 301. The input device 340 may include a touch pad, a touch panel, or a button. The touch pad may recognize touch inputs in at least one of capacitive, resistive, infrared, or ultrasonic methods. If a capacitive touch pad is provided, physical contact or proximity recognition may be possible. The touch pad may further include a tactile layer. The touch pad including the tactile layer may provide a tactile response to the user. The button may include, e.g., a physical button or an optical key.

The electronic device interface 345 may support one or more specified protocols to be used for the first external electronic device 301 to be connected with the electronic devices 201 and 202 directly or wirelessly. According to an embodiment, the electronic device interface 345 may include, for example, a high definition multimedia interface (HDMI), a universal serial bus (USB) interface, a secure digital (SD) card interface, or an audio interface. According to an embodiment, the interface 345 may include connecting terminals for forming physical connections with the electronic devices 201 and 202. According to an embodiment, the processor 310 may identify whether a physical connection is formed between the first external electronic device 301 and the electronic devices 201 and 202 through the electronic device interface 345. According to an embodiment, if the processor 310 identifies a physical contact between the first external electronic device 301 and the electronic devices 201 and 202 through the electronic device interface 345, the processor 310 may generate a charging signal that initiates charging of the electronic devices 201 and 202. According to an embodiment, the processor 310 may identify, through the electronic device interface 345, that either or both of the electronic devices 201 and 202 have been removed from the first external electronic device 301, and the processor 310 may generate a removal signal for stopping charging of the removed electronic device 201 and/or 202.

The power interface 350 may support one or more specified protocols to be used for the first external electronic device 301 to be connected with the power source 305 or the external electronic device (e.g., the second external electronic device 205 of FIG. 2) directly or wirelessly. The power interface 350 according to an embodiment may include some of a USB connector, a lightening connector, or a receptacle connector for another connector capable of providing power to the first external electronic device 301. The power interface 350 according to an embodiment may adopt a structure including an antenna module 321 to wirelessly receive power from the power source 305 or an external electronic device (e.g., the second external electronic device 205 of FIG. 2).

The memory 360 may store various data used by at least one component (e.g., the processor 310 or a sensor module 330) of the first external electronic device 301. The various data may include, for example, software and input data or output data for a command related thereto. The memory 360 may include a volatile memory or a non-volatile memory.

The memory 360 may store setting information related to a Bluetooth communication connection. The setting information may include at least one of first Bluetooth address information, second Bluetooth address information, or identification information for the first external electronic device 301. According to an embodiment, the first Bluetooth address information or the second Bluetooth address information may include a Bluetooth device address (e.g., BD_ADDR) or LE address information generated based on the Bluetooth device address. According to an embodiment, the first Bluetooth address information or the second Bluetooth address information may further include device type information indicating one of a right earbud or a left earbud. According to an embodiment, the first Bluetooth address information or the second Bluetooth address information may further include device type information indicating one of a master device or a slave device. According to an embodiment, the first Bluetooth address information and the second Bluetooth address information may include different Bluetooth device addresses and device type information. According to an embodiment, the setting information regarding the Bluetooth communication connection may further include identification information for the first external electronic device 301. According to an embodiment, the identification information for the first external electronic device 301 may include communication address information (e.g., MAC address or Bluetooth address) of the first external electronic device 301 or may include unique identification information, such as a serial number, set by the manufacturer of the first external electronic device 301. The identification information for the first external electronic device 301 is not limited to the above example and may include information in various formats for identifying the first external electronic device 301.

The memory 360 may store information regarding use of at least one of an NFC tag, a radio frequency identification (RFID) tag, a magnetic secure transmission (MST) device, a quick response (QR) code, or a bar code. According to certain embodiments, at least one of the NFC tag, the RFID tag, the MST device, the QR code, or the barcode may be included in the first external electronic device 301 or may be included in a component of the first external electronic device 301 illustrated in FIG. 3 or may be implemented as a separate component in the first external electronic device 301. At least one of the NFC tag, the RFID tag, the MST device, the QR code, or the barcode may store at least one of first Bluetooth address information, second Bluetooth address information, or identification information for the first external electronic device 301.

The power management module 370 may manage power supplied to the first external electronic device 301. According to one embodiment, the power management module 370 may be implemented as at least part of, for example, a PMIC. According to an embodiment, the power management module 370 may include a battery charging module. According to an embodiment, the power management module 370 may wirelessly or wiredly receive power from the power source 305 or an external electronic device (e.g., the second external electronic device 205 of FIG. 2) under the control of the processor 310 and charge the battery 380. According to an embodiment, the power management module 370 may wirelessly or wiredly provide the power of the battery to the electronic devices 201 and 202 through the electronic device interface 345 or the antenna module 321 under the control of the processor 310.

The battery 380 may supply power to at least one component of the first external electronic device 301. According to an embodiment, the battery 380 may include, for example, a primary cell which is not rechargeable, a secondary cell which is rechargeable, or a fuel cell.

The first electronic device 201 may identify at least one of the first Bluetooth address information, the second Bluetooth address information, or the identification information for the first external electronic device 301 stored in at least one of the memory 360, the NFC tag, the RFID tag, the MST device, the QR code, or the barcode from the first external electronic device 301 through a communication module (e.g., the communication module 210 of FIG. 2) or a sensor module (e.g., the sensor module 230 of FIG. 2).

The first external electronic device 301 may further include various modules depending on the form in which it is provided. There are many variations according to the convergence trend of digital devices, so it is not possible to list them all, but components equivalent to the above-mentioned components may be further included in the first external electronic device 301. Further, it is apparent that in the first external electronic device 301 according to an embodiment, specific components may be excluded from the above components or replaced with other components according to the form in which it is provided. This will be easily understood by those of ordinary skill in the art.

Figure 4:
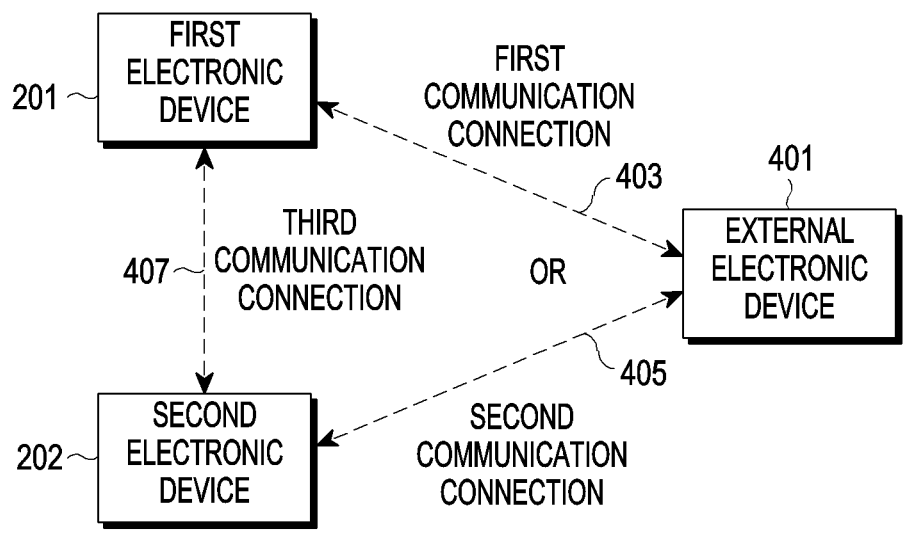
FIG. 4 is a view illustrating a first electronic device, a second electronic device, and/or an external electronic device in a wireless communication environment, according to certain embodiments.

FIG. 4 is a view illustrating a first electronic device 201, a second electronic device 202, and/or an external electronic device 401 (e.g., the second external electronic device 205) in a wireless communication environment according to certain embodiments.

Either the first electronic device 201 forms a first communication connection 403, with the external electronic device 401, or the second electronic device 202 forms a second communication connection with the external electronic device 401. The one of the first and second electronic device 201 and 202 that form the respective communication connection can be deemed the master device, while the other can be deemed the slave device. Additionally, the first electronic device 201 and the second electronic device 202 form a third communication connection 407 with each other.

Both the first electronic device 201 and the second electronic device 202 receive a voice signal output from their respective microphones. As noted above, the first electronic device 201 and the second electronic device 202 can determine noise information by comparing the voice signal output from the air conduction microphone with the voice signal output from the bone conduction microphone and/or acceleration sensor. The slave device provides the noise information to the master device. The master device compares the noise information from the slave device with the noise information at the master device. Where the master device determines that the slave device has less noise or a higher signal to noise ratio, the master device can transmit control signals on the third communication connection 407 to initiate change of roles where the master device becomes the slave device and vice versa. The master device, which was previously the slave device establishes a communication connection with the external electronic device 401, while the slave device which was previously the master device releases a communication connection with the external electronic device 401.

Figure 5A:
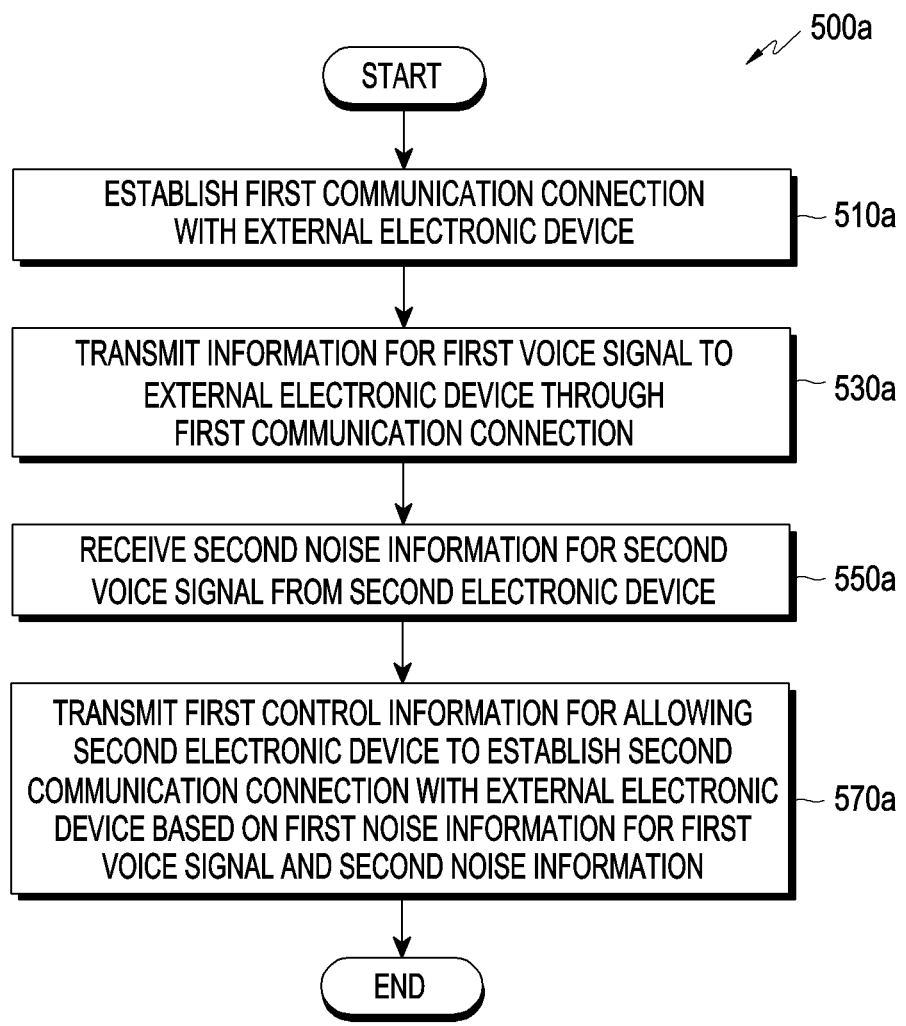
FIG. 5A is a flowchart illustrating a method in which a first electronic device controls a communication connection of a second electronic device by comparing noise at the first electronic device with noise at the second electronic device, according to certain embodiments.
Figure 5B:
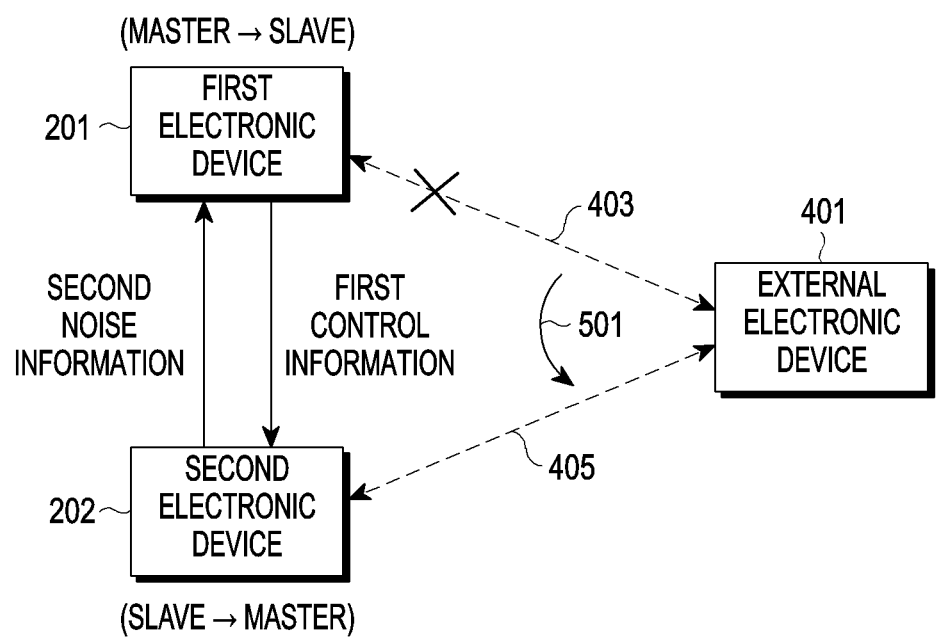
FIG. 5B is a view illustrating a method in which a first electronic device controls a communication connection of a second electronic device by comparing noise at the first electronic device with noise at the second electronic device, according to certain embodiments.
Figure 6:
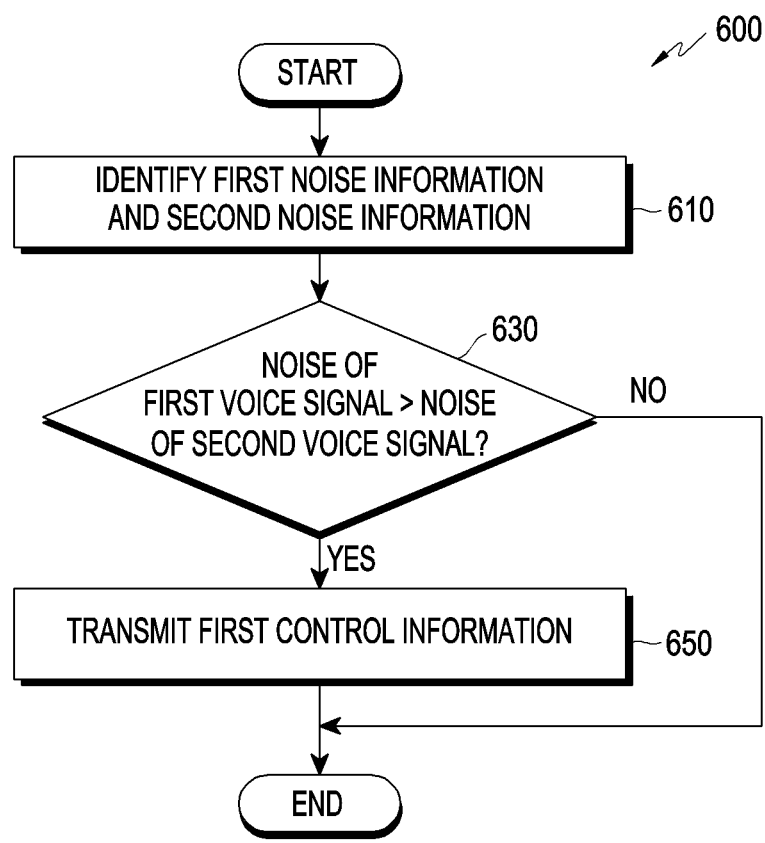
FIG. 6 is a flowchart illustrating a method in which a first electronic device transmits first control information to control a communication connection of a second electronic device by comparing noise at the first electronic device with noise at the second electronic device, according to certain embodiments.

FIGS. 4-6 describe how the first electronic device 201 begins as the master device and maintains a first communication connection 403. When the first electronic device 201 determines that the second electronic device 202 has less noise, the second electronic device 202 becomes the master device. The first electronic device 201 releases the first communication connection 403 and the second electronic device 202 establishes the second communication connection 405.

The first electronic device 201 and/or the second electronic device 202 may be communicatively connected with the external electronic device 401. For example, a communication connection (or a communication link) (e.g., the first communication connection 403 and/or the second communication connection 405) between the first electronic device 201 and/or the second electronic device 202 and the external electronic device 401 may be formed based on Bluetooth communication (e.g., Bluetooth low energy (BLE) communication and/or Bluetooth legacy communication). The above-described communication connection (or communication link) (e.g., the first communication connection 403 and/or the second communication connection 405) may be formed based on various communication schemes (e.g., Wi-Fi communication) other than Bluetooth communication and is not limited to the above-mentioned example.

The first electronic device 201 and the second electronic device 202 may be communicatively connected. For example, the communication connection (e.g., the third communication connection 407) between the first electronic device 201 and the second electronic device 202 may be formed based on Bluetooth communication (e.g., BLE communication).

According to certain embodiments, either the first electronic device 201 or the second electronic device 202 may be communicatively connected with the external electronic device 401. For example, either the first electronic device 201 or the second electronic device 202 may be set as the master device, and the other may be set as a slave device. The master device may establish a communication connection with the external electronic device 401 to transmit and/or receive data to/from the external electronic device 401. The slave device may transmit and/or receive data to/from the external electronic device 401 through the master device. More specifically, the slave device may receive at least a portion of data transmitted by the external electronic device 401 or data related thereto from the master device through the third communication connection 407. The slave device may transmit data to be transmitted to the external electronic device 401 to the master device through the third communication connection 407. At least a portion of the transmitted data or data related thereto may be transmitted to the external electronic device 401 by the master device. As another example, the slave device may obtain, from the master device, connection information for the communication connection formed between the master device and the external electronic device 401 (e.g., at least one of address information for the electronic device, clock information, channel information, service discovery protocol (SDP) result information, supported features, manufacture data, or key information (e.g., link key)). The slave device may obtain at least a portion of data transmitted by the external electronic device 401 and received by the master device based on the obtained connection information.

As described above, either the first electronic device 201 or the second electronic device 202 may be set as the master device, and the other may be set as a slave device. The master device may directly transmit and/or receive data through a communication connection to/from the external electronic device 401. The slave device may receive data from the master device through a communication connection (e.g., the third communication connection 407) with the master device without forming a direct communication connection with the external electronic device 401 or may obtain data transmitted and/or received through the communication connection formed between the master device and the external electronic device 401. A third communication connection 407 may be formed between the master device and the slave device, and data may be transmitted and/or received therebetween through the third communication connection 407.

According to an embodiment, both the first electronic device 201 and the second electronic device 202 may be communicatively connected with the external electronic device 401. For example, both the first communication connection 403 and the second communication connection 405 of FIG. 4 may be formed. Data transmission and/or reception between the first electronic device 201 and the external electronic device 401 may be performed through the first communication connection 403, and data transmission and/or reception between the second electronic device 202 and the external electronic device 401 may be performed through the second communication connection 405. The communication connection (e.g., the third communication connection 407) between the first electronic device 201 and the second electronic device 202 may be omitted.

The first electronic device 201 and the second electronic device 202 each may include at least one microphone (e.g., the microphone 242 of FIG. 2). The first electronic device 201 and the second electronic device 202 may detect (e.g., sense) an external voice using at least one microphone included therein. According to certain embodiments, since the external voices detected by the first electronic device 201 and the second electronic device 202 are detected every same time, they may be voices corresponding to (e.g., synchronized with) each other. The detected external voice may include the user's voice according to the user's utterance and/or noise from the ambient environment.

The first electronic device 201 and the second electronic device 202 obtain at least one voice signal output from their respective at least one microphone to obtain information for the noise from the ambient environment (hereinafter, noise information). For example, the first electronic device 201 and the second electronic device 202 may obtain noise information based on the voice signal output from an air conduction microphone and the voice signal output from a voice pickup unit (VPU) (e.g., a bone conduction microphone and/or an acceleration sensor). The operations for the first electronic device 201 and the second electronic device 202 to obtain noise information may be performed in synchronization with each other. For example, the operation in which each of the first electronic device 201 and the second electronic device 202 obtains noise information may be performed from the time when both the first electronic device 201 and the second electronic device 202 are removed from the first external electronic device (e.g., the first external electronic device 204 of FIG. 2) or when both are plugged into the user's body (e.g., ears). When the first electronic device 201 and the second electronic device 202 each are removed from the first external electronic device 204 or worn on the user's body (e.g., ears), it may transmit an indication to the counterpart device to inform the counterpart device that it has been removed from the first external electronic device 204 or that it has been worn on the user's body (e.g., ear). The operation for each of the first electronic device 201 and the second electronic device 202 to obtain noise information may be performed every preset period (e.g., every same preset period). For example, the operation in which each of the first electronic device 201 and the second electronic device 202 obtains noise information may be performed, every preset period, from the time when both the first electronic device 201 and the second electronic device 202 are removed from the first external electronic device (e.g., the first external electronic device 204 of FIG. 2) or when both are plugged into the user's body (e.g., ears). The noise information may include characteristics of ambient noise (e.g., noise level and/or noise type). For example, the noise type may be identified based on a variation in noise level. For example, the noise information may include average characteristics (e.g., long-term characteristics) of ambient noise that are measured for a preset time period (e.g., measured every preset period). As another example, the noise information may include instant characteristics (e.g., short-term characteristics) of ambient noise measured in real time. The noise information may include at least one of the presence or absence of directional noise (e.g., wind) detected from each of the first electronic device 201 and the second electronic device 202, the magnitude of directional noise detected from each device, the level (e.g., magnitude) of noise detected from each device, or the signal-to-noise ratio (SNR) of the voice signal detected (or obtained) from each device, as identified from the characteristics of ambient noise (e.g., noise level and/or noise type).

The first electronic device 201 and the second electronic device 202 may obtain information for the ambient noise-reduced voice from at least one obtained voice signal based on their respective noise information. For example, the ambient noise-reduced voice may be a voice in which ambient noise has been reduced (or removed) from the external voice detected by at least one microphone. The user's voice according to the user's utterance may be detected more accurately. According to an embodiment, the first electronic device 201 and the second electronic device 202 perform signal processing (e.g., voice activity detection (VAD)) on at least one voice signal output from their respective at least one microphone, obtaining information for the ambient noise-reduced voice.

The first electronic device 201 or the second electronic device 202 may transmit its obtained noise information to the counterpart device. For example, of the first electronic device 201 and the second electronic device 202, the electronic device set as the slave device may transmit its obtained noise information to the electronic device set as the master device through the third communication connection 407. The master device may compare the noise information received from the slave device with its obtained noise information and set (e.g., change) the electronic device set as the slave device to the master device or maintain as the slave device, which is described in more detail in connection with the drawings.

The first electronic device 201 or the second electronic device 202 may transmit information for the voice signal to the external electronic device 401. For example, information for the voice signal transmitted to the external electronic device 401 may include information for ambient noise-reduced voice. As another example, the information for the voice signal transmitted to the external electronic device 401 may include information for at least one voice signal obtained through at least one microphone by the first electronic device 201 or the second electronic device 202 (e.g., information for voice without reduction in ambient noise). The electronic device that transmits information for the voice signal to the external electronic device 401 may be the electronic device set as the master device. For example, of the first electronic device 201 and the second electronic device 202, the electronic device set as the master device may transmit information for its obtained voice signal through a communication connection (e.g., the communication connection, corresponding to the master device, of the first communication connection 403 or the second communication connection 405) to the external electronic device 401. For example, of the first electronic device 201 and the second electronic device 202, the electronic device set as the slave device may not transmit information for its obtained voice signal to the external electronic device 401. The electronic device set as the slave device may perform an operation for transmitting its obtained noise information to the master device without obtaining information for the voice signal.

In the following drawings, for convenience of description, the first electronic device 201 may be set as the master device, and the second electronic device 202 is set as the slave device unless otherwise specified.

FIG. 5A is a flowchart 500a illustrating a method in which a first electronic device (e.g., the first electronic device 201 of FIG. 2) compares noise at the first electronic device 201 and noise at a second electronic device (e.g., the second electronic device 202 of FIG. 2) and controls communication connection of the second electronic device 202. FIG. 5B is a view illustrating a method in which a first electronic device (e.g., the first electronic device 201 of FIG. 2) compares noise at the first electronic device 201 and noise at a second electronic device (e.g., the second electronic device 202 of FIG. 2) and controls communication connection of the second electronic device 202. This is described below with reference to FIGS. 5A and 5B together.

The first electronic device 201 may establish a first communication connection 403 with an external electronic device (e.g., the external electronic device 401 of FIG. 4) in operation 510a. For example, each of the first electronic device 201 and the second electronic device 202 may identify whether it is worn on the user's ear using a sensor module (e.g., the sensor module 230 of FIG. 2) (e.g., a proximity sensor) included therein. If it is identified that the first electronic device 201 is worn on the user's ear before the second electronic device 202 is worn, the first electronic device 201 may transmit information (e.g., an indication) indicating that the first electronic device 201 has been worn on the user's ear to the second electronic device 202 through to a third communication connection (e.g., the third communication connection 407 of FIG. 4). Upon receiving the information (e.g., an indication) indicating that the first electronic device 201 is worn on the user's ear from the first electronic device 201 before it is identified that the second electronic device 202 is worn on the user's ear, the second electronic device 202 may identify that the second electronic device 202 is worn on the user's ear after the first electronic device 201 is worn. Upon identifying that the first electronic device 201 is worn on the user's ear before receiving the information (e.g., an indication) indicating that the second electronic device 202 is worn on the user's ear from the second electronic device 202, the first electronic device 201 may identify that the first electronic device 201 is worn on the user's ear earlier than the second electronic device 202. The first electronic device 201 first worn on the user's ear may be set as the master device, and the second electronic device 202 worn later on the user's ear may be set as the slave device. The first electronic device 201 set as the master device may establish a communication connection (e.g., the first communication connection 403) with the external electronic device 401 using a communication circuit (e.g., the communication module 210 of FIG. 2) included in the first electronic device 201. The second electronic device 202 set as the slave device may not form a communication connection (e.g., the second communication connection 405 of FIG. 4) with the external electronic device 401.

The first electronic device 201 may transmit information for a first voice signal to the external electronic device 401 through the first communication connection 403 in operation 530a. For example, the first electronic device 201 may detect an external voice through at least one microphone (e.g., the microphone 242 of FIG. 2) included in the first electronic device 201 and may obtain at least one voice signal (hereinafter, a first voice signal) output from at least one microphone (e.g., the microphone 242). The processor of the first electronic device 201 (e.g., the processor 290 of FIG. 2) may obtain, from the obtained first voice signal, information for an ambient noise-reduced voice signal (hereinafter, information for the first voice signal). The processor 290 of the first electronic device 201 may transmit the information for the first voice signal to the external electronic device 401 through the first communication connection 403 using a communication circuit (e.g., the communication module 210). The transmitted information for the first voice signal may be transmitted, as call voice data, to another external electronic device (e.g., the electronic device 104) that, along with the external electronic device 401, forms (e.g., is on the phone with the user of the external electronic device 401) a second network (e.g., the second network 199 of FIG. 1).

The first electronic device 201 may receive second noise information for the second voice signal from the second electronic device 202 in operation 550a. For example, like the first electronic device 201, the second electronic device 202 may also detect an external voice through at least one microphone (e.g., the microphone 242) included in the second electronic device 202 and may obtain at least one voice signal (hereinafter, a second voice signal) output from at least one microphone (e.g., the microphone 242). The second voice signal may correspond to the first voice signal obtained by the first electronic device 201. For example, the second voice signal may be a voice signal for the voice detected every same time as the voice of the first voice signal. The second electronic device 202 may obtain noise information for the second voice signal (hereinafter, second noise information) and may transmit the obtained second noise information to the first electronic device 201 through the third communication connection 407. If it is identified based on the second noise information that the level of the ambient noise is greater than or equal to a threshold level (e.g., a second threshold level), the second electronic device 202 may transmit the second noise information to the first electronic device 201.

In operation 570a, the first electronic device 201 may transmit first control information to allow the second electronic device 202 to establish the second communication connection 405 with the external electronic device 401 based on the first noise information for the first voice signal and second noise information. For example, the first noise information may be noise information for the first voice signal obtained by the first electronic device 201. For example, the first control information may include instructions (e.g., a command) commanding, or for allowing, the second electronic device 202 to establish the second communication connection 405 with the external electronic device 401. For example, the first control information may include device information for the external electronic device 401. The first electronic device 201 may identify an electronic device relatively less influenced by external noise by comparing the first noise information and the second noise information. If it is identified based on the first noise information that the level of the ambient noise is greater than or equal to a threshold level (e.g., the second threshold level), the first electronic device 201 may compare the first noise information and the second noise information. If it is identified that the voice detected from the second electronic device 202 is relatively less influenced by ambient noise as a result of comparison, the first electronic device 201 may perform at least one procedure to set the second electronic device 202 as the master device. For example, the first electronic device 201 may transmit the first control information to the second electronic device 202 through the third communication connection 407 to control the second electronic device 202 to form the second communication connection 405 (e.g., to allow the second electronic device 202 to initiate at least one procedure to form the second communication connection 405 with the external electronic device 401). As another example, the first electronic device 201 may transmit the first control information to the external electronic device 401 through the first communication connection 403 to control the external electronic device 401 to form the second communication connection 405 (e.g., to allow the external electronic device 401 to initiate at least one procedure to form the second communication connection 405 with the external electronic device 202). For example, the first electronic device 201 may release the formed first communication connection 403 based on transmitting the first control information (in other words, disconnect the first communication connection with the external electronic device 401). As another example, after transmitting the first control information, the first electronic device 201 may release the first communication connection 403 if receiving information indicating that the second communication connection 405 is established from the second electronic device 202 or the external electronic device 401. As described above, it may be described as the communication connection between the first and second electronic devices 201 and 202 and the external electronic device 401 being switched 501 from the first communication connection 403 to the second communication connection 405.

According to certain embodiments, as the second electronic device 202 is set (e.g., changed) to the master device while the information for the voice signal obtained through at least one microphone (e.g., the microphone 242) of the first electronic device 201 is transmitted to the external electronic device 401, the information for the voice signal obtained through at least one microphone (e.g., the microphone 242) of the second electronic device 202 may be transmitted to the external electronic device 401.

According to certain embodiments, if it is identified as a result of comparison that the voice detected by the first electronic device 201 is relatively less influenced by ambient noise, the first electronic device 201 may maintain the existing settings of the master device and the slave device.

The obtaining of a voice signal using at least one microphone of each of the first electronic device 201 and the second electronic device 202 may be performed regardless of the settings of the master device or the slave device. For example, the first electronic device 201 and the second electronic device 202 may receive the external voice through their at least one microphone regardless of whether the communication connection is established with the external electronic device 401. The obtaining of the noise information for each of the first electronic device 201 and the second electronic device 202 may be performed irrespective of settings as the master device or the slave device.

As described above, the master device may compare the noise information for its obtained voice signal with the noise information for the voice signal obtained by the slave device and allows the user's voice, obtained through the electronic device relatively less influenced by external noise, to be transferred to the external electronic device, thereby enhancing call quality.

FIG. 6 is a flowchart 600 illustrating a method in which a first electronic device (e.g., the first electronic device 201 of FIG. 2) compares noise at the first electronic device 201 and noise at a second electronic device (e.g., the second electronic device 202 of FIG. 2) and transmits first control information to control communication connection of the second electronic device 202. It is assumed below that the first electronic device 201 may be set as the master device, and the second electronic device 202 is set as the slave device unless otherwise specified.

The first electronic device 201 may identify the first noise information and the second noise information in operation 610. The first noise information may be noise information for the first voice signal obtained by the first electronic device 201, and the second noise information may be noise information for the second voice signal obtained by the second electronic device 202. For example, the first electronic device 201 may receive the second noise information from the second electronic device 202 and identify the second noise information.

According to certain embodiments, in operation 630, the first electronic device 201 may identify whether the noise of the first voice signal exceeds the noise of the second voice signal. For example, the first electronic device 201 may identify characteristics of ambient noise included in each of the first noise information and the second noise information. The first electronic device 201 may identify whether the magnitude (e.g., level) of ambient noise included in the first noise information exceeds the magnitude (e.g., level) of ambient noise included in the second noise information. As another example, the first electronic device 201 may identify information identified from the characteristics of ambient noise included in each of the first noise information and the second noise information. The first electronic device 201 may identify whether the SNR of the first voice signal included in the first noise information is less than the SNR of the second voice signal included in the second noise information. As another example, if directional noise is detected from the first electronic device 201 (or the level of the directional noise is identified as greater than or equal to a threshold), and if directional noise is not detected from the second electronic device 202 (or the level of the directional noise is identified as less than the threshold) based on the first noise information and the second noise information, the first electronic device 201 may perform operation 650. The first electronic device 201 may identify whether a difference between the noise of the first voice signal and the noise of the second voice signal is equal to or greater than a threshold level (e.g., the first threshold level) and, if it is identified that the difference between the noise of the first voice signal and the noise of the second voice signal is equal to or greater than the threshold level (e.g., the first threshold level), the first electronic device 201 may perform operation 650.

According to certain embodiments, if it is identified that the noise of the first voice signal exceeds the noise of the second voice signal (e.g., if it is identified that the voice detected from the second electronic device 202 is relatively less influenced by ambient noise), the first electronic device 201 may transmit the first control information in operation 650. For example, the first control information may include instructions to enable the second electronic device 202 to establish a communication connection (e.g., the second communication connection 405 of FIG. 4) with the external electronic device 401. According to certain embodiments, after transmitting the first control information, the first electronic device 201 may release the communication connection (e.g., the first communication connection 403 of FIG. 4) with the external electronic device 401.

According to certain embodiments, if it is identified that the noise of the first voice signal does not exceed the noise of the second voice signal (e.g., if it is identified that the voice detected from the first electronic device 201 is relatively less influenced by ambient noise), the first electronic device 201 may not transmit the first control information. Accordingly, the settings of the master device and the slave device may be maintained.

It is noted that after the second electronic device 202 becomes the master device, a circumstance may occur that the noise at the first electronic device 201 is less. Accordingly, FIG. 7-8B describe how the second electronic device 202 starts as the master device and becomes the slave device, and the first electronic device 201 starts as the slave device and becomes the master device.

Figure 7:
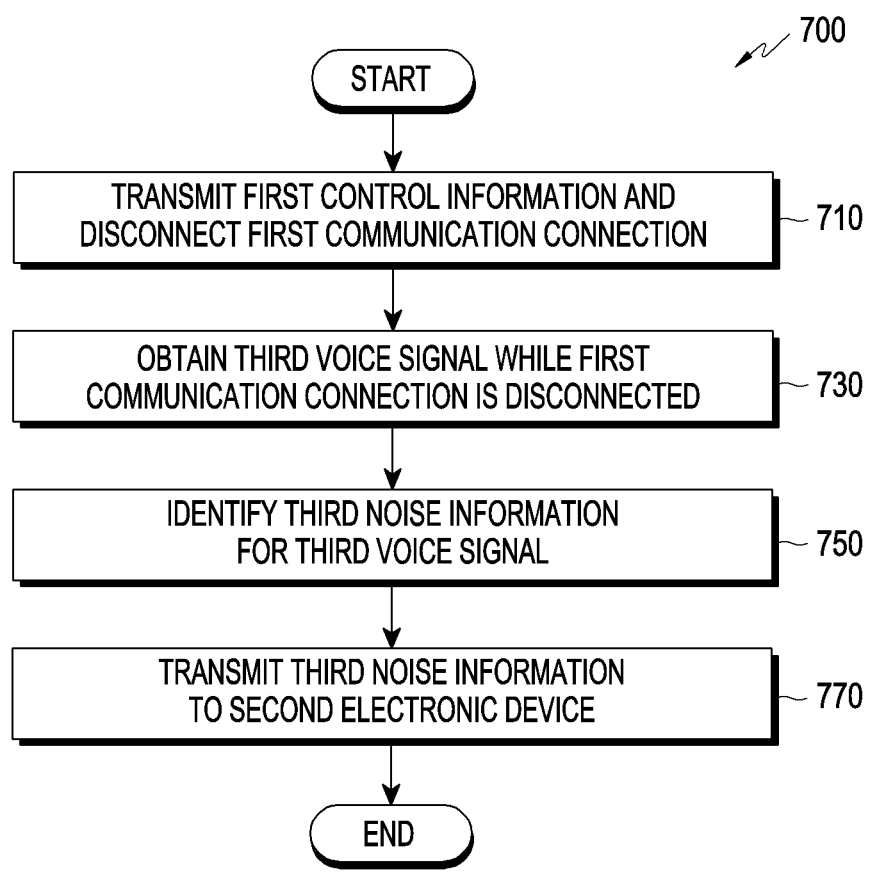
FIG. 7 is a flowchart illustrating a method in which a first electronic device provides information about noise at the first electronic device to a second electronic device after releasing a communication connection with an external electronic device, according to certain embodiments.

FIG. 7 is a flowchart 700 illustrating a method in which a first electronic device (e.g., the first electronic device 201 of FIG. 2) provides information for noise at the first electronic device 201 to the second electronic device (e.g., the second electronic device 202 of FIG. 2) after the communication connection (e.g., the first communication connection 403 of FIG. 4) with the external electronic device according to certain embodiments.

The first electronic device 201 may transmit first control information and may release the first communication connection 403 in operation 710. The second electronic device 202 may form the second communication connection (e.g., the second communication connection 405 of FIG. 2) with the external electronic device (e.g., the external electronic device 401 of FIG. 4) based on the transmission of the first control information. The first electronic device 201 may be set as the slave device (e.g., changed (e.g., switched) from the master device to the slave device), and the second electronic device 202 may be set as the master device (e.g., changed (e.g., switched) from the slave device to the master device).

According to certain embodiments, in operation 730, the first electronic device 201 may obtain a third voice signal while the first communication connection 403 is released. For example, while the first communication connection 403 is released, the first electronic device 201 may detect an external voice through at least one microphone (e.g., the microphone 242 of FIG. 2) included in the first electronic device 201 and may obtain at least one voice signal (hereinafter, a third voice signal) output from at least one microphone (e.g., the microphone 242).

The first electronic device 201 may identify the third noise information for the third voice signal in operation 750. For example, the third noise information may include average characteristics (e.g., long-term characteristics) of ambient noise measured for a preset time while the first communication connection 403 is released. As another example, the third noise information may include instant characteristics (e.g., short-term characteristics) of ambient noise measured in real time while the first communication connection 403 is released. The operation of identifying the third noise information by the first electronic device 201 may be performed every preset period (e.g., every same preset period).

The first electronic device 201 may transmit third noise information to the second electronic device 202 in operation 770. For example, the first electronic device 201 may transmit the third noise information identified while the first communication connection 403 is released, through the third communication connection (e.g., the third communication connection 407 of FIG. 4) to the second electronic device 202.

As described above, even after the first electronic device 201, which used to be the master device, is changed (e.g., switched) to the slave device, the first electronic device 201 may perform the operations of obtaining the voice signal and identifying the noise information and may transmit (e.g., report) noise information to the second electronic device 202.

Figure 8A:
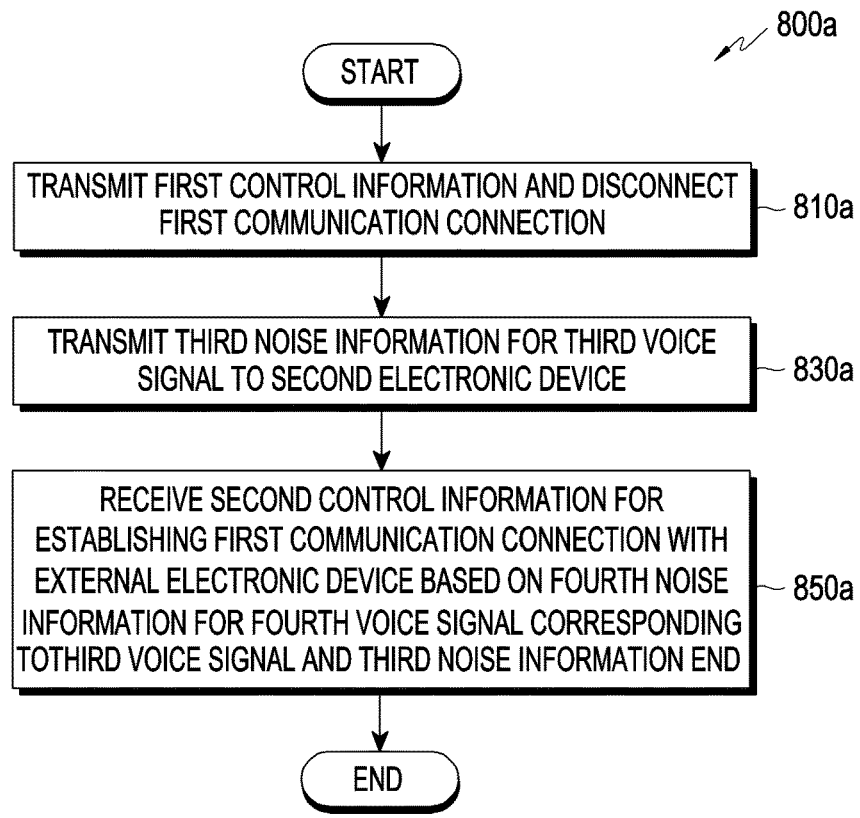
FIG. 8A is a flowchart illustrating a method in which a first electronic device re-establishes a communication connection with an external electronic device, according to certain embodiments.

FIG. 8A is a flowchart 800a illustrating a method in which a first electronic device (e.g., the first electronic device 201 of FIG. 2) reestablishes a communication connection (e.g., the first communication connection 403 of FIG. 2) with an external electronic device (e.g., the external electronic device 401 of FIG. 4) according to certain embodiments.

Figure 8B:
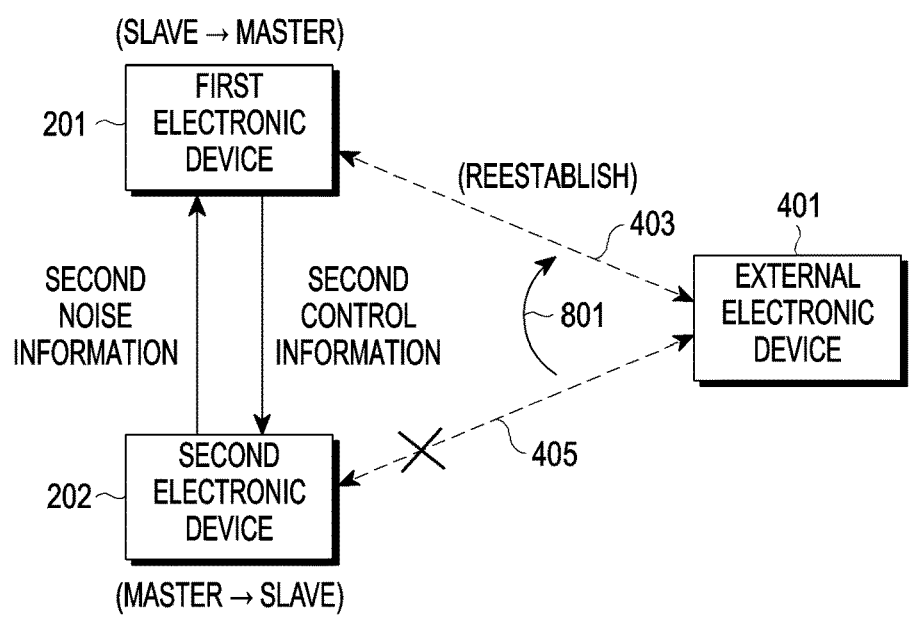
FIG. 8B is a view illustrating a method in which a first electronic device re-establishes a communication connection with an external electronic device, according to certain embodiments.

FIG. 8B is a view illustrating a method in which the first electronic device 201 reestablishes a communication connection (e.g., the first communication connection 403) with the external electronic device 401 according to certain embodiments. This is described below with reference to FIGS. 8A and 8B together.

The first electronic device 201 may transmit first control information and may release the first communication connection 403 in operation 810A. The second electronic device (e.g., the second electronic device 202 of FIG. 2) may form the second communication connection (e.g., the second communication connection 405 of FIG. 2) with the external electronic device 401 based on the transmission of the first control information. The first electronic device 201 may be set as the slave device (e.g., changed (e.g., switched) from the master device to the slave device), and the second electronic device 202 may be set as the master device (e.g., changed (e.g., switched) from the slave device to the master device).

The first electronic device 201 may transmit third noise information for the third voice signal to the second electronic device 202 in operation 830a.

According to certain embodiments, in operation 850a, the first electronic device 201 may receive second control information for forming the first communication connection 403 with the external electronic device 403 based on the third noise information and fourth noise information for a fourth voice signal corresponding to the third voice signal. For example, like the first electronic device 201, the second electronic device 202 may obtain the fourth voice signal by detecting an external voice through at least one microphone (e.g., the microphone 242 of FIG. 2) included in the second electronic device 202. The fourth voice signal obtained by the second electronic device 202 may be the voice signal for the voice detected every same time as the voice of the third voice signal. The second electronic device 202 may obtain noise information for the fourth voice signal (hereinafter, fourth noise information) and may compare the third noise information received from the first electronic device 201 with the obtained fourth noise information. If it is identified that the voice detected from the first electronic device 201 is relatively less influenced by ambient noise as a result of comparison, the second electronic device 202 may perform at least one procedure to set (e.g., change) the first electronic device 201 as the master device. For example, the second electronic device 202 may transmit the second control information to the first electronic device 201 through the third communication connection 407 to control the first electronic device 201 to form (e.g., reestablish) the first communication connection 403 (e.g., to allow the first electronic device 201 to initiate at least one procedure to reestablish the released first communication connection 403 with the external electronic device 401). As another example, the second electronic device 202 may transmit the second control information to the external electronic device 401 through the second communication connection 405 to control the external electronic device 401 to form (e.g., reestablish) the first communication connection 403 (e.g., to allow the external electronic device 401 to initiate at least one procedure to reestablish the released first communication connection 403 with the first electronic device 201). For example, the second control information may include instructions (e.g., a command) for allowing the first electronic device 201 to establish the first communication connection 403 with the external electronic device 401. For example, the second control information may include device information for the external electronic device 401. According to certain embodiments, while the first electronic device 201 establishes the first communication connection 403, the second communication connection 405 of the second electronic device 202 may be released. As described above, it may be described as the communication connection between the first and second electronic devices 201 and 202 and the external electronic device 401 being switched 801 from the second communication connection 405 to the first communication connection 403. According to certain embodiments, as the first electronic device 201 is set (e.g., changed) to the master device while the information for the voice signal obtained through at least one microphone (e.g., the microphone 242) of the second electronic device 202 is transmitted to the external electronic device 401, the information for the voice signal obtained through at least one microphone (e.g., the microphone 242) of the first electronic device 201 may be transmitted to the external electronic device 401.

According to certain embodiments, if it is identified that the voice detected by the second electronic device 202 is relatively less influenced by ambient noise, the second electronic device 202 may maintain the existing settings of the master device and the slave device.

As described above, the first electronic device 201, which used to be the master device, may transmit (e.g., report) noise information to the second electronic device 202 even after changed (e.g., switched) to the slave device and may be changed (e.g., switched) back to the master device based on the control of the second electronic device 202 that has been changed (e.g., switched) to the master device. Thus, as the master device to detect the user's voice to be transmitted to the external electronic device 401 is changed back to the first electronic device 201, call quality may be enhanced.

Figure 9:
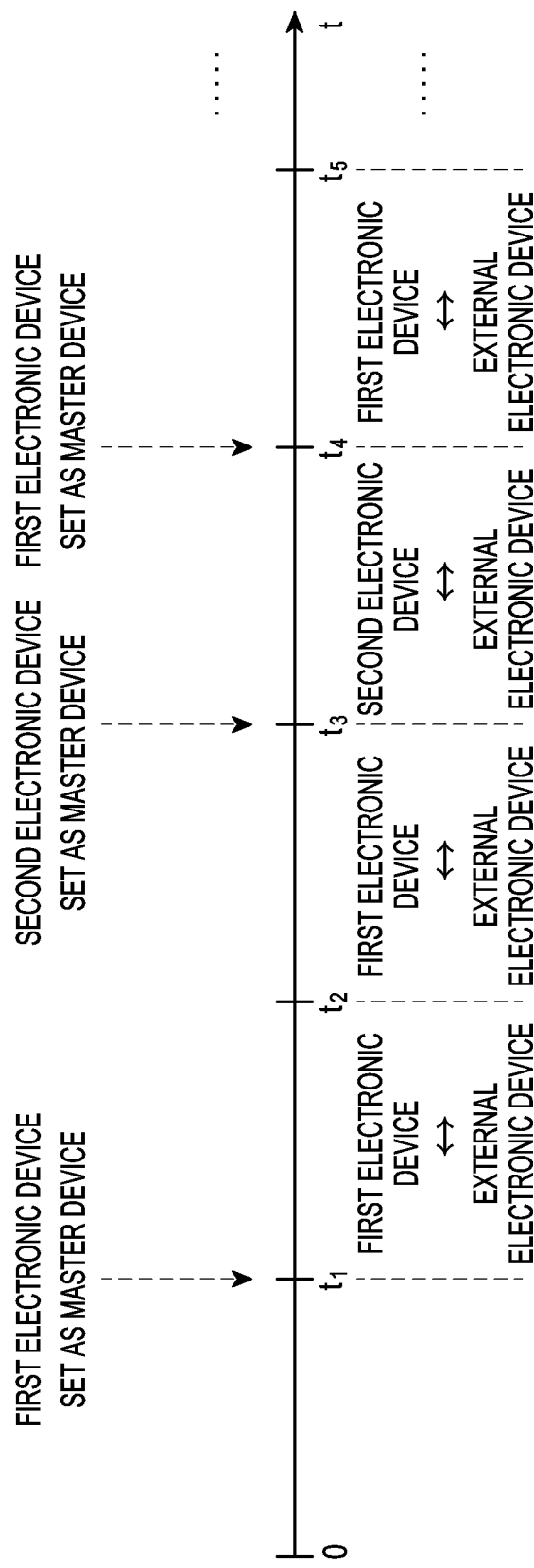
FIG. 9 is a view illustrating a method for maintaining or changing a setting of a master device according to comparison of noise at a first and second electronic device, performed in each preset period, according to certain embodiments.

In certain embodiments, the noise information can be compared over regular intervals, e.g., $t_1$, $t_2$, $t_3$, $t_4$, and $t_5$. In FIG. 9, it can be seen the first electronic device 201 is the master device at $t_1$. At time $t_3$, second electronic device 202 is becomes the master device. At the next interval, $t_4$, first electronic device 201 becomes the master device.

FIG. 9 is a view illustrating a method for maintaining or changing a setting of a master device according to comparison of noise at a first and second electronic device (e.g., the first and second electronic devices 201 and 202 of FIG. 2), performed in each preset period, according to certain embodiments.

According to certain embodiments, at $t_1$, the first electronic device 201 may be set as the master device. For example, if the first electronic device 201 is worn on the user's ear before the second electronic device 202 is worn, the first electronic device 201 may be set as the master device, and that the second electronic device 202 may be set as the slave device. According to certain embodiments, as the first electronic device 201 is set as the master device at $t_1$, the first electronic device 201 may establish a communication connection (e.g., the first communication connection 403 of FIG. 4) with the external electronic device 401 and may transmit and/or receive data to/from the external electronic device 401 through the established communication connection (e.g., the first communication connection 403). For example, the first electronic device 201 may transmit information for the user's voice (e.g., information for the voice signal) detected through at least one microphone (e.g., the microphone 242 of FIG. 2) included in the first electronic device 201 to the external electronic device 401 and receive, from the external electronic device 401, data (e.g., data for call voice received from another external electronic device (e.g., the electronic device 104 of FIG. 1) forming the second network (e.g., the second network 199 of FIG. 1) with the external electronic device 401). Information for the user's voice detected by the first electronic device 201 may be transmitted to the other external electronic device 401 (e.g., the electronic device 104) forming the second network 199 with the external electronic device 401, and the data received from the external electronic device 401 may be output through a speaker (e.g., the speaker 241 of FIG. 2) of the first electronic device 201.

According to certain embodiments, at $t_2$, noises at the first electronic device 201 and the second electronic device 202 may be compared. The time interval (e.g., period) between $t_1$ and $t_2$ may be previously set. According to certain embodiments, at $t_2$, the first electronic device 201, which is the master device, may receive noise information for the external voice detected by the second electronic device 202 after $t_1$ (or from $t_1$) from the second electronic device 202 and compare it with noise information for the external voice detected by the first electronic device 201 after $t_1$ (or from $t_1$). If it is identified as a result of comparison that the voice detected by the first electronic device 201 is relatively less influenced by ambient noise, the first electronic device 201 may maintain the settings of the master device and the slave device. According to certain embodiments, as it is determined to maintain the settings of the master device and slave device at $t_2$, the first electronic device 201 may continuously transmit and/or receive data to/from the external electronic device 401.

According to certain embodiments, at $t_3$, noises at the first electronic device 201 and the second electronic device 202 may be compared. The time interval (e.g., period) between $t_2$ and $t_3$ may be identical to the time interval between $t_1$ and $t_2$, and may be preset. According to certain embodiments, at $t_3$, the first electronic device 201, which is set as the master device, may receive noise information for the external voice detected by the second electronic device 202 after $t_2$ (or from $t_2$) from the second electronic device 202 and compare it with noise information for the external voice detected by the first electronic device 201 after $t_2$ (or from $t_2$). If it is identified as a result of comparison that the voice detected by the second electronic device 202 is relatively less influenced by ambient noise, the first electronic device 201 may change the settings of the master device and the slave device. According to certain embodiments, as the settings of the master device and slave device are changed at $t_3$, the second electronic device 202 may transmit and/or receive data to/from the external electronic device 401.

According to certain embodiments, at $t_4$, noises at the first electronic device 201 and the second electronic device 202 may be compared. The time interval (e.g., period) between $t_3$ and $t_4$ may be identical to the time interval between $t_1$ and $t_2$ and the time interval between $t_2$ and $t_3$ and may be preset. According to certain embodiments, at $t_4$, the second electronic device 202, which is set as the master device, may receive noise information for the external voice detected by the second electronic device 202 after $t_3$ (or from $t_3$) from the first electronic device 201 and compare it with noise information for the external voice detected by the second electronic device 202 after $t_3$ (or from $t_3$). If it is identified as a result of comparison that the voice detected by the first electronic device 201 is relatively less influenced by ambient noise, the second electronic device 202 may change the settings of the master device and the slave device. According to certain embodiments, as the settings of the master device and slave device are changed at $t_4$, the first electronic device 201 may transmit and/or receive data to/from the external electronic device 401.

According to certain embodiments, at $t_5$, noises at the first electronic device 201 and the second electronic device 202 may be compared. The time interval (e.g., period) between $t_4$ and $t_5$ may be the same as the above-described time intervals. According to certain embodiments, even after $t_5$, the electronic device set as the master device may receive noise information from the counterpart device (e.g., the slave device) every same time interval (e.g., period) and compare it with noise information for its detected external voice, maintaining or changing the settings of the master device and slave device.

Figure 10:
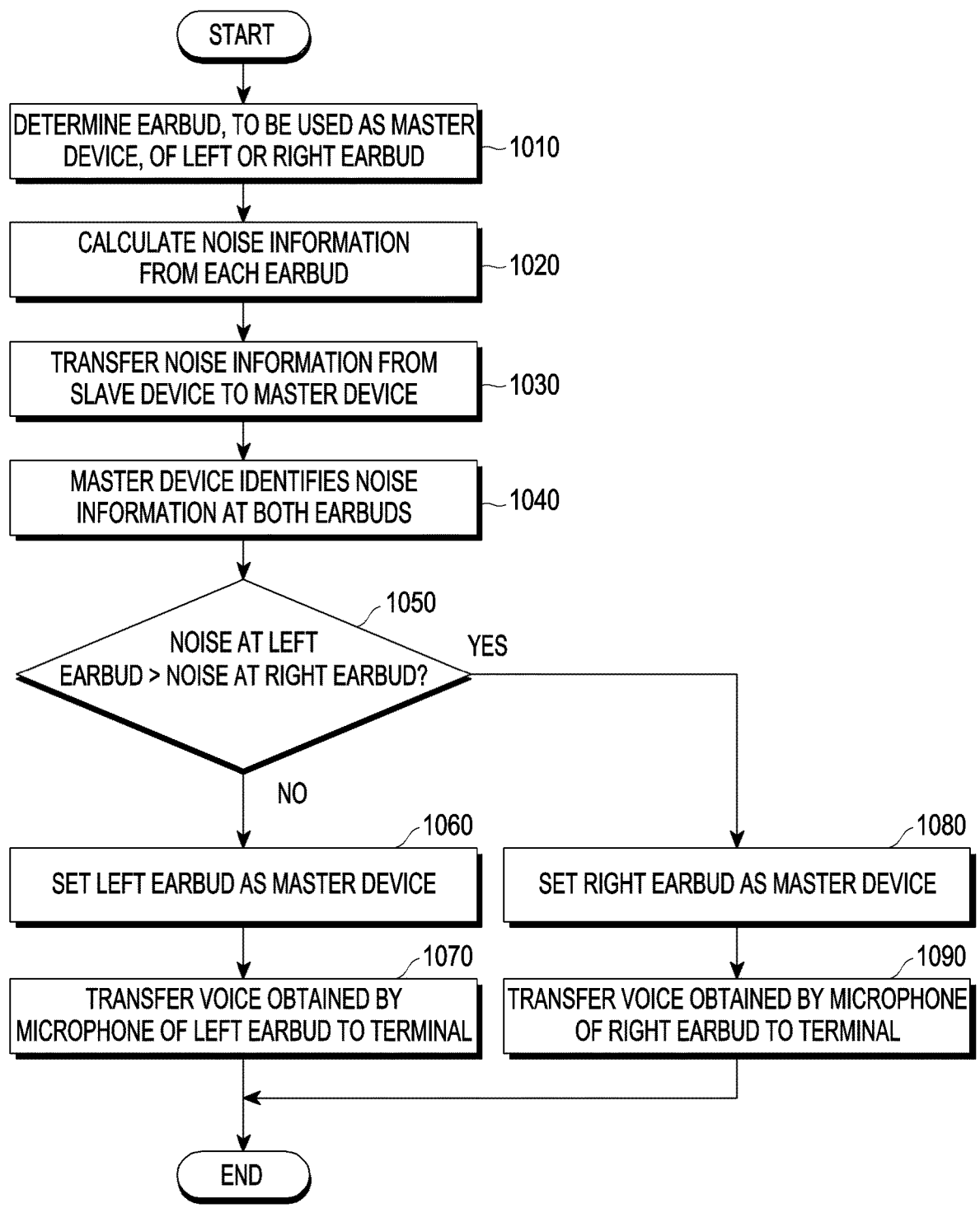
FIG. 10 is a flowchart illustrating a method for operating a pair of earbuds, according to certain embodiments.

FIG. 10 is a flowchart 1000 illustrating a method for operating a pair of earbuds (e.g., the first and second electronic devices 201 and 202 of FIG. 2) according to certain embodiments.

It is assumed below that the first electronic device 201 is the left earbud and the second electronic device 202 is the right earbud.

In operation 1010, an earbud to be used as a master device, of the left earbud or the right earbud, may be determined. For example, of the left earbud or the right earbud, the earbud first worn on the user's body (e.g., ear) may be determined as the earbud to be used as the master device. Of the left earbud or the right earbud, the earbud worn later on the user's body (e.g., ear) may be determined as the earbud to be used as the slave device. According to certain embodiments, a communication connection (e.g., the third communication connection 407 of FIG. 4) may be formed between the left earbud and the right earbud, and a communication connection (e.g., the communication connection, corresponding to the master device, of the first communication connection 403 or the second communication connection 405 of FIG. 4) may be formed between the earbud determined as the master device and the external electronic device (e.g., the external electronic device 401 of FIG. 4).

In operation 1020, noise information may be calculated from each earbud. For example, external voices may be detected through the microphone of the left earbud (e.g., the microphone 242 of FIG. 2) and the microphone of the right earbud (e.g., the microphone 242), and noise information for the external voice detected by each earbud may be calculated (e.g., identified).

In operation 1030, the slave device may transfer noise information to the master device. For example, the earbud determined as the slave device may transmit noise information, it calculated (e.g., identified), to the master device through the communication connection (e.g., the third communication connection 407) formed with the master device. For example, an operation in which the slave device transfers noise information may be performed every preset period.

In operation 1040, the master device may identify noise information from both the earbuds. For example, the master device may identify each of the noise information transferred from the slave device and the noise information it calculated (e.g., identified).

In operation 1050, the master device may identify whether the noise at the left earbud is greater than the noise at the right earbud. For example, the master device may compare the identified noise information to identify whether the influence of external noise on the voice detected by the left earbud is greater than the influence of the external noise on the voice detected by the right earbud.

If it is not identified that the noise at the left earbud is greater than the noise at the right earbud, in operation 1060, the left earbud may be set as the master device. For example, if the left earbud is the earbud determined as the master device in operation 1010, the settings of the master device and the slave device may be maintained. For example, if the left earbud is the earbud determined as the slave device in operation 1010, the settings of the master device and the slave device may be changed according to the control of the master device (e.g., the right earbud).

In operation 1070, the left earbud may transfer the voice obtained by the microphone (e.g., the microphone 242 of FIG. 2) to the external electronic device 401. The left earbud may receive data (e.g., call voice data) from the external electronic device 401 and output the call voice through a speaker (e.g., the speaker 241 of FIG. 2) included in the left earbud. The right earbud may receive data (e.g., call voice data), received by the left earbud from the external electronic device 401, from the left earbud or may obtain data (e.g., call voice data) based on connection information for the communication connection formed between the left earbud and the external electronic device 401 and output the call voice through a speaker (e.g., the speaker 241) included in the right earbud. Even thereafter, the right earbud set (or changed) as the slave may obtain an external voice through a microphone (e.g., the microphone 242), identify noise information for the external voice, and transfer it to the left earbud.

According to certain embodiments, if it is identified that the noise at the left earbud is greater than the noise at the right earbud, in operation 1080, the right earbud may be set as the master device. For example, if the right earbud is the earbud determined as the master device in operation 1010, the settings of the master device and the slave device may be maintained. For example, if the right earbud is the earbud determined as the slave device in operation 1010, the settings of the master device and the slave device may be changed according to the control of the master device (e.g., the left earbud).

In operation 1090, the right earbud may transfer the voice obtained by the microphone (e.g., the microphone 242) to the external electronic device 401. The left earbud may receive data (e.g., call voice data) from the external electronic device 401 and output the call voice through a speaker (e.g., the speaker 241) included in the right earbud. The left earbud may receive data (e.g., call voice data), received by the right earbud from the external electronic device 401, from the right earbud or may obtain data (e.g., call voice data) based on connection information for the communication connection formed between the right earbud and the external electronic device 401 and output the call voice through a speaker (e.g., the speaker 241) included in the left earbud. Even thereafter, the left earbud set (or changed) as the slave may obtain an external voice through a microphone (e.g., the microphone 242), identify noise information for the external voice, and transfer it to the right earbud.

The above-described operations of the left earbud and right earbud (e.g., the first and second electronic devices 201 and 202) may be described below as an example.

For example, it may be hypothesized that the user rides and drives a vehicle while wearing the left earbud and the right earbud on her ears. If the user puts the left earbud on the ear before the right earbud, the left earbud may be set as the master device, and the right earbud may be set as the slave device. If the user is on a call with another person, the user's voice detected through the microphone of the left earbud, which is the master device, may be transferred to the device of the other person on the call. It may be assumed that the user opens the left window while sitting on the left seat of the vehicle. If wind enters the vehicle through the left window, wind noise may have a more influence on the left earbud than the right earbud. The master device, the left earbud, may identify that the noise to itself is greater than the noise to the right earbud, and the right earbud may be set to the master device, and the left earbud may be changed to the slave device. Thereafter, the user's voice detected through the microphone of the right earbud set (e.g., changed) as the master device may be transferred to the device of the other party on the call. It may be assumed that the user opens the right window while sitting on the left seat of the vehicle. If wind enters the vehicle through the right window, wind noise may have a more influence on the right earbud than the left earbud. The master device, the left earbud, may identify that the noise to itself is smaller than the noise to the right earbud, and the settings of the master device and slave device may be maintained.

As described above, the ear-wearable device composed of a pair of earbuds allows the user's voice detected through the earbuds with less noise influence (e.g., noise) to be transferred to the other party on the call, enhancing call quality.

In certain embodiments, the master and slave device can be changed in response to user input. When the left earbud 1109 is the master electronic device and detects that the right earbud 1111 has less noise, the left earbud 1109 can cause electronic device 401 to display a graphical user interface 1103 indicating the same. The graphical user interface 1103 can ask the user whether they would like to switch to using the microphone with the right earbud 1111. Responsive to selection of the YES button 1105, the left earbud 1109 and right earbud 1111 swap roles.

Figure 11:
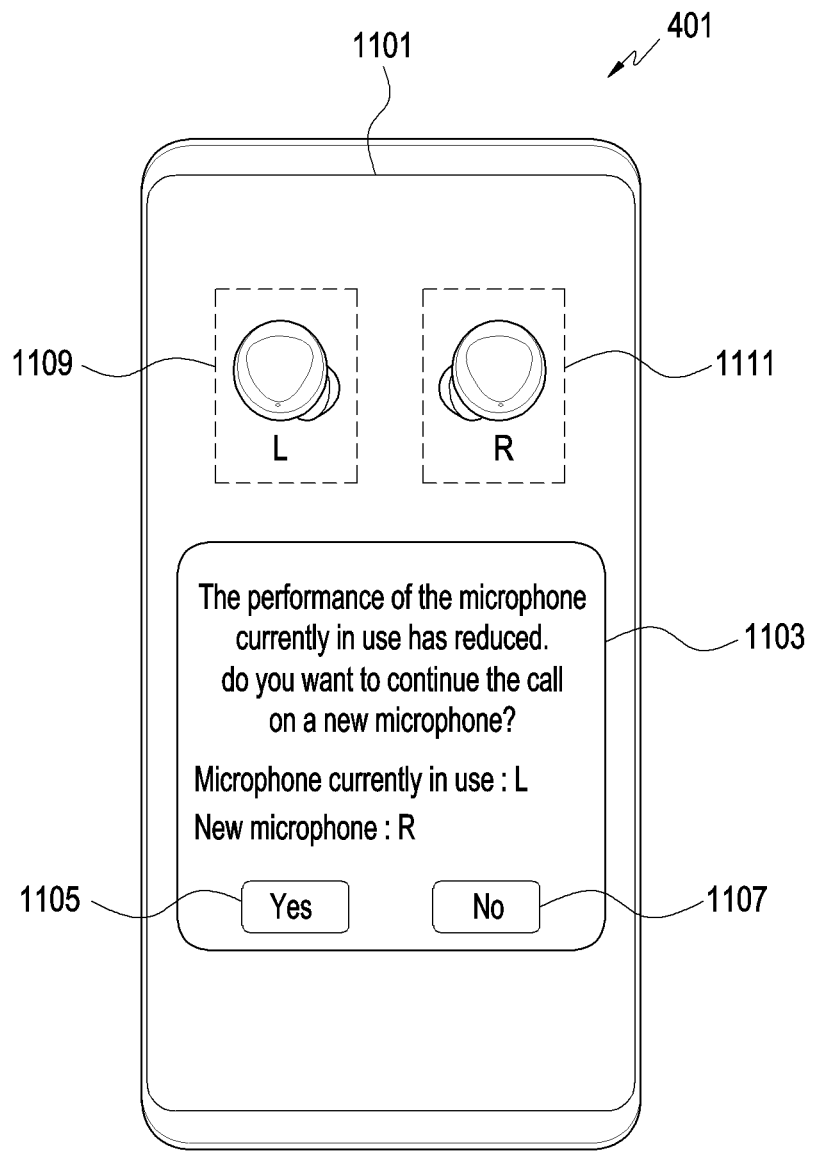
FIG. 11 illustrates an example of a screen that may be displayed on a display of an external electronic device according to certain embodiments.

FIG. 11 illustrates an example of a screen that may be displayed on a display 1101 (e.g., the display module 160 of FIG. 1) of the external electronic device 401 according to certain embodiments.

The external electronic device 401 may receive a message indicating that the settings of the master device and the slave device may be changed from a first electronic device (e.g., the first electronic device 201) and/or a second electronic device (e.g., the second electronic device 202 of FIG. 2). For example, the external electronic device 401 may receive a message indicating that the master device may be changed to the slave device from the master device of the first electronic device 201 and the second electronic device 202.

According to certain embodiments, if the message indicating that the settings of the master device and the slave device are changed is received, the external electronic device 401 may display a notification message 1103 illustrated in FIG. 11 on the display 1101. The notification message 1103 may include information (e.g., "The performance of the microphone currently in use has reduced") indicating that the noise of the external voice detected by the master device exceeds a certain level or the noise of the external voice detected by the master device is relatively larger than the noise for the external voice detected by the slave device. The notification message 1103 may include information (e.g., "Do you want to continue the call on a new microphone?") indicating that the settings of the master device and the slave device may be changed. The notification message 1103 may include information for the earbud currently set as the master device (e.g., "Microphone currently in use: L") and/or information for the earbud to be set (or changed) as the master device (e.g., "New microphone: R").

According to certain embodiments, if an input (e.g., a touch input) for selecting a first option 1105 is detected through the display 1101 (e.g., a touchscreen), the external electronic device 401 may transmit an approval message to the master device (e.g., the earbud corresponding to L). The master device (e.g., the earbud corresponding to L) may change the settings of the master device and the slave device if the approval message is received. For example, the master device (e.g., the earbud corresponding to L) may transmit control information for establishing a communication connection between the external electronic device 401 and the slave device to the slave device (e.g., the earbud corresponding to R) or the external electronic device 401. The master device (e.g., the earbud corresponding to L) may be changed to the slave device (e.g., the communication connection between the earbud corresponding to L and the external electronic device 401 is released), and the slave device (e.g., the earbud corresponding to R) may be changed to the master device (e.g., a communication connection between the earbud corresponding to R and the external electronic device 401 is formed).

According to certain embodiments, if an input (e.g., a touch input) for selecting a second option 1107 is detected through the display 1101 (e.g., a touchscreen), the external electronic device 401 may transmit no approval message or a rejection message to the master device (e.g., the earbud corresponding to L). The master device (e.g., the earbud corresponding to L) may maintain the settings of the master device and the slave device if an approval message is not received or a rejection message is received within a preset time.

According to certain embodiments, information (e.g., text and/or images) indicating the current settings of the master device and the slave device may be displayed on the display 1101. For example, a first object 1109 representing the left earbud and a second object 1111 representing the right earbud may be displayed. According to the current settings of the master device and the slave device, the first object 1109 and the second object 1111 may be displayed to be visually distinguished from each other. For example, if the left earbud is set as the master device, a visual effect (e.g., a shadow effect) may be displayed on the image of the first object 1109, or text (e.g., "L") of the first object 1109 may be displayed in bold. According to certain embodiments, if the settings of the master device and the slave device are changed, the display of the first object 1109 and/or the second object 1111 may be changed to correspond to the changed settings. For example, if the right earbud is changed to the master device, a visual effect (e.g., a shadow effect) may be displayed on the image of the second object 1111, or the text (e.g., "R") of the second object 1111 may be displayed in bold.

According to certain embodiments, a first electronic device (e.g., the first electronic device 201 of FIG. 2) may comprise at least one microphone (e.g., the microphone 242 of FIG. 2), a communication circuit (e.g., the communication module 210 of FIG. 2), and at least one processor (e.g., the processor 290 of FIG. 2). The at least one processor may be configured to establish a first communication connection with an external electronic device using the communication circuit, transmit, through the first communication connection, to the external electronic device, using the communication circuit, information for a first voice signal obtained using the at least one microphone, receive second noise information for a second voice signal from a second electronic device (e.g., the second electronic device 202 of FIG. 2), by the communication circuit, wherein the second voice signal corresponding to the first voice signal was obtained by the second electronic device while the information for the first voice signal was transmitted to the external electronic device, and transmit, based on first noise information for the first voice signal and the received second noise information, first control information for allowing the second electronic device to establish a second communication connection with the external electronic device, using the communication circuit.

According to certain embodiments, the at least one processor may be further configured to disconnect the first communication connection established with the external electronic device, responsive to transmitting of the first control information.

According to certain embodiments, the at least one processor may be further configured to obtain a third voice signal using the at least one microphone, while the first communication connection is disconnected, identify third noise information for the obtained third voice signal, and transmit the identified third noise information to the second electronic device using the communication circuit.

According to certain embodiments, the at least one processor may be further configured to after disconnecting the first communication connection, receive second control information for reestablishing the first communication connection with the external electronic device using the communication circuit, and reestablish the first communication connection based on the receiving of the second control information.

According to certain embodiments, the at least one processor may be configured to identify a difference between a noise of the first voice signal and a noise of the second voice signal, based on the first noise information and the received second noise information.

According to certain embodiments, the at least one processor may be configured to identify whether the difference between the noise of the first voice signal and the noise of the second voice signal is equal to or greater than a first threshold, and transmit the first control information, based on identifying that the difference between the noise of the first voice signal and the noise of the second voice signal is equal to or greater than the first threshold.

According to certain embodiments, the at least one processor may be further configured to identify the first noise information, identify whether a noise of the first voice signal is equal to or greater than a second threshold, and compare the first noise information and the received second noise information, based on identifying that the noise of the first voice signal is equal to or greater than the second threshold.

According to certain embodiments, the at least one processor may be further configured to identify at least one of whether a directional noise exists, a magnitude of the directional noise, a level of noise detected from the first electronic device and the second electronic device, or a signal-to-noise ratio (SNR) of a voice signal detected from the first electronic device and the second electronic device, based on the first noise information and the second noise information.

According to certain embodiments, the first noise information may include an average value of noise information of a voice signal obtained during a predetermined period using the at least one microphone. The average value of the noise information may be identified every preset period.

According to certain embodiments, the first electronic device may be set as a master device while the first communication connection is established, and the second electronic device may be set as the master device while the second communication connection is established. An electronic device set as the master device between the first electronic device and the second electronic device may be configured to compare noise information and transmit information for a voice signal to the external electronic device.

According to certain embodiments, a method for controlling a first electronic device may comprise establishing a first communication connection with an external electronic device, using a communication circuit of the first electronic device, transmitting through the established first communication connection, to the external electronic device, using the communication circuit, information for a first voice signal obtained using at least one microphone of the first electronic device, receiving second noise information for a second voice signal from a second electronic device, using the communication circuit, wherein a second voice signal corresponding to the first voice signal is obtained by the second electronic device while the information for the first voice signal is transmitted to the external electronic device; and transmitting, based on first noise information for the first voice signal and the received second noise information, first control information for allowing the second electronic device to establish a second communication connection with the external electronic device, using the communication circuit.

The method may further comprise disconnecting the first communication connection established with the external electronic device, responsive to the transmitting of the first control information.

According to certain embodiments, the method may further comprise obtaining a third voice signal, using the at least one microphone, while the first communication connection is disconnected, identifying third noise information for the obtained third voice signal, and transmitting the identified third noise information to the second electronic device using the communication circuit.

According to certain embodiments, the method may further comprise, after disconnecting the first communication connection, receiving second control information for reestablishing the first communication connection with the external electronic device using the communication circuit, and reestablishing the first communication connection, based on the receiving of the second control information.

According to certain embodiments, transmitting the first control information, based on the first noise information and the received second noise information, may include identifying a difference between a noise of the first voice signal and a noise of the second voice signal, based on the first noise information and the received second noise information.

According to certain embodiments, the method for controlling the first electronic device may further comprise identifying the first noise information, identifying whether noise of the first voice signal is a second threshold or more, and comparing the first noise information and the received second noise information based on identifying that the noise of the first voice signal is the second threshold or more.

According to certain embodiments, the method may further comprise identifying whether the difference between the noise of the first voice signal and the noise of the second voice signal is equal to or greater than a first threshold, and wherein the specified condition is whether the difference between the noise of the first voice signal and the noise of the second voice signal is equal to or greater than the first threshold.

According to certain embodiments, the method may further comprise identifying the first noise information, identifying whether a noise of the first voice signal is equal to or greater than a second threshold, and comparing the first noise information and the received second noise information, based on identifying that the noise of the first voice signal is equal to or greater than the second threshold.

According to certain embodiments, the method may further comprise identifying at least one of whether a directional noise exists, a magnitude of the directional noise, a level of noise detected from the first electronic device and the second electronic device, or a signal-to-noise ratio (SNR) of a voice signal detected from the first electronic device and the second electronic device, based on the first noise information and the second noise information.

According to certain embodiments, the first noise information includes an average value of noise information of a voice signal obtained during a predetermined period using the at least one microphone, and wherein the average value of the noise information is identified every preset period.

According to certain embodiments, a second electronic device (e.g., the second electronic device 202 of FIG. 2) may comprise at least one microphone (e.g., the microphone 242 of FIG. 2), a communication circuit (e.g., the communication module 210 of FIG. 2), and at least one processor (e.g., the processor 290 of FIG. 2). The at least one processor may be configured to obtain a second voice signal using the at least one microphone, the second voice signal being obtained while information for a first voice signal corresponding to the second voice signal, obtained by a first electronic device (e.g., the first electronic device 201 of FIG. 2), is transmitted to an external electronic device, identify second noise information for the obtained second voice signal, transmit the identified second noise information to the first electronic device using the communication circuit, receive first control information for establishing a second communication connection with the second electronic device using the communication circuit based on the transmission of the second noise information, establish a second communication connection with the external electronic device using the communication circuit based on the reception of the first control information, and transmit information for a voice signal obtained using the at least one microphone to the external electronic device through the established second communication connection.

The at least one processor may be configured to receive, from the first electronic device, third noise information for a third voice signal obtained by the first electronic device while the second communication connection is established, using the communication circuit and transmit second control information for allowing the first electronic device to establish the first communication connection with the external electronic device using the communication circuit based on fourth noise information for the fourth voice signal corresponding to the third voice signal and the received third noise information. The fourth voice signal may be obtained using the at least one microphone.

The at least one processor may be configured to disconnect the second communication connection established with the external electronic device, based on the transmission of the second control information.

The at least one processor may be configured to obtain a fifth voice signal using the at least one microphone, while the second communication connection is disconnected, identify fifth noise information for the obtained fifth voice signal, and transmit the identified fifth noise information to the first electronic device using the communication circuit.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, The integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A first electronic device, comprising:
at least one microphone,
a communication circuit, and
at least one processor,
wherein the at least one processor is configured to:
establish a first communication connection with an external electronic device using the communication circuit,
transmit through the first communication connection, to the external electronic device, using the communication circuit, information for a first voice signal obtained using the at least one microphone,
receive second noise information for a second voice signal from a second electronic device, by the communication circuit, wherein the second voice signal corresponding to the first voice signal was obtained by the second electronic device while the information for the first voice signal was transmitted to the external electronic device, and
transmit, based on first noise information for the first voice signal and the received second noise information, first control information for allowing the second electronic device to establish a second communication connection with the external electronic device, using the communication circuit.

2. The first electronic device of claim 1, wherein the at least one processor is further configured to disconnect the first communication connection established with the external electronic device, responsive to transmitting of the first control information.

3. The first electronic device of claim 2, wherein the at least one processor is further configured to:
obtain a third voice signal, using the at least one microphone, while the first communication connection is disconnected,
identify third noise information for the obtained third voice signal, and
transmit the identified third noise information to the second electronic device using the communication circuit.

4. The first electronic device of claim 2, wherein the at least one processor is further configured to:
after disconnecting the first communication connection, receive second control information for reestablishing the first communication connection with the external electronic device using the communication circuit, and
reestablish the first communication connection, based on the receiving of the second control information.

5. The first electronic device of claim 1, wherein the at least one processor is configured to:
identify a difference between a noise of the first voice signal and a noise of the second voice signal, based on the first noise information and the received second noise information.

6. The first electronic device of claim 5, wherein the at least one processor is configured to:
identify whether the difference between the noise of the first voice signal and the noise of the second voice signal is equal to or greater than a first threshold, and
transmit the first control information, based on identifying that the difference between the noise of the first voice signal and the noise of the second voice signal is equal to or greater than the first threshold.

7. The first electronic device of claim 1, wherein the at least one processor is further configured to:
identify the first noise information,
identify whether a noise of the first voice signal is equal to or greater than a second threshold, and
compare the first noise information and the received second noise information, based on identifying that the noise of the first voice signal is equal to or greater than the second threshold.

8. The first electronic device of claim 1, wherein the at least one processor is further configured to identify at least one of whether a directional noise exists, a magnitude of the directional noise, a level of noise detected from the first electronic device and the second electronic device, or a signal-to-noise ratio (SNR) of a voice signal detected from the first electronic device and the second electronic device, based on the first noise information and the second noise information.

9. The first electronic device of claim 1, wherein the first noise information includes an average value of noise information of a voice signal obtained during a predetermined period using the at least one microphone, and
wherein the average value of the noise information is identified every preset period.

10. The first electronic device of claim 1, wherein the first electronic device is set as a master device while the first communication connection is established, and the second electronic device is set as the master device while the second communication connection is established, and
wherein an electronic device set as the master device between the first electronic device and the second electronic device, is configured to compare noise information and transmit information for a voice signal to the external electronic device.

11. A method for controlling a first electronic device, the method comprising:
establishing a first communication connection with an external electronic device, using a communication circuit of the first electronic device;
transmitting through the established first communication connection, to the external electronic device, using the communication circuit, information for a first voice signal obtained using at least one microphone of the first electronic device;

receiving second noise information for a second voice signal from a second electronic device, using the communication circuit, wherein a second voice signal corresponding to the first voice signal is obtained by the second electronic device while the information for the first voice signal is transmitted to the external electronic device; and transmitting, based on first noise information for the first voice signal and the received second noise information, first control information for allowing the second electronic device to establish a second communication connection with the external electronic device, using the communication circuit.

12. The method of claim 11, further comprising disconnecting the first communication connection established with the external electronic device, responsive to the transmitting of the first control information.

13. The method of claim 12, further comprising:
obtaining a third voice signal, using the at least one microphone, while the first communication connection is disconnected;
identifying third noise information for the obtained third voice signal; and
transmitting the identified third noise information to the second electronic device using the communication circuit.

14. The method of claim 12, further comprising:
after disconnecting the first communication connection, receiving second control information for reestablishing the first communication connection with the external electronic device using the communication circuit; and
reestablishing the first communication connection, based on the receiving of the second control information.

15. The method of claim 11, wherein transmitting the first control information, based on the first noise information and the received second noise information, includes:
identifying a difference between a noise of the first voice signal and a noise of the second voice signal, based on the first noise information and the received second noise information.

16. The method of claim 15, further comprising:
identifying whether the difference between the noise of the first voice signal and the noise of the second voice signal is equal to or greater than a first threshold, and
transmitting the first control information, based on identifying that the difference between the noise of the first voice signal and the noise of the second voice signal is equal to or greater than the first threshold.

17. The method of claim 11, further comprising:
identifying the first noise information,
identifying whether a noise of the first voice signal is equal to or greater than a second threshold, and
comparing the first noise information and the received second noise information, based on identifying that the noise of the first voice signal is equal to or greater than the second threshold.

18. The method of claim 11, further comprising identifying at least one of whether a directional noise exists, a magnitude of the directional noise, a level of noise detected from the first electronic device and the second electronic device, or a signal-to-noise ratio (SNR) of a voice signal detected from the first electronic device and the second electronic device, based on the first noise information and the second noise information.

19. The method of claim 11, wherein the first noise information includes an average value of noise information of a voice signal obtained during a predetermined period using the at least one microphone, and
wherein the average value of the noise information is identified every preset period.

20. An electronic device comprising:
at least one microphone;
a communication circuit; and
at least one processor, wherein the at least one processor is configured to:
obtain a second voice signal using the at least one microphone,
identify second noise information for the obtained second voice signal, transmit the identified second noise information to a first electronic device using the communication circuit,
receive first control information;
responsive to receiving the first control information, establish a communication connection with a second electronic device using the communication circuit based on the transmission of the second noise information, and establish a second communication connection with an external electronic device using the communication circuit, and
transmit information for a voice signal obtained using the at least one microphone to the external electronic device through the established second communication connection.

* * * * *